(12) United States Patent
Teranishi

(10) Patent No.: US 8,898,524 B2
(45) Date of Patent: Nov. 25, 2014

(54) COMPUTER-READABLE MEDIUM STORING WRAPPER PROGRAM AND INTEGRATED CIRCUIT APPARATUS

(75) Inventor: Masaomi Teranishi, Yokohama (JP)

(73) Assignee: Fujitsu Semiconductor Limited, Yokohama (JP)

(*) Notice: Subject to any disclaimer, the term of this patent is extended or adjusted under 35 U.S.C. 154(b) by 115 days.

(21) Appl. No.: 13/330,237

(22) Filed: Dec. 19, 2011

(65) Prior Publication Data

US 2012/0239985 A1   Sep. 20, 2012

(30) Foreign Application Priority Data

Mar. 17, 2011   (JP) ................ 2011-058996

(51) Int. Cl.
- G06F 11/00   (2006.01)
- G06F 9/54   (2006.01)
- G06F 9/44   (2006.01)
- G06F 11/07   (2006.01)

(52) U.S. Cl.
CPC ............ *G06F 11/0781* (2013.01); *G06F 9/541* (2013.01); *G06F 8/76* (2013.01); *G06F 11/0784* (2013.01)
USPC .............................. 714/38.1; 714/25; 714/57

(58) Field of Classification Search
USPC ............................................ 714/38.1, 25, 48
See application file for complete search history.

(56) References Cited

U.S. PATENT DOCUMENTS

| | | | |
|---|---|---|---|
| 6,745,385 B1 | 6/2004 | Lupu et al. | |
| 2003/0061543 A1 | 3/2003 | Misaka et al. | |
| 2008/0046441 A1* | 2/2008 | Wen et al. | 707/100 |
| 2012/0110369 A1* | 5/2012 | Tylutki | 714/2 |

FOREIGN PATENT DOCUMENTS

| | | |
|---|---|---|
| JP | 2003-508846 | 3/2003 |
| JP | 2003-99254 | 4/2003 |
| JP | 2004-246690 A | 9/2004 |

OTHER PUBLICATIONS

"I-right/TK (ITRON Wrapper for T-Kernel)", http://www.t-engine4u.com/products/iright_tk.html Personal Media Co., Ltd., partial English translation, (accessed date—Jan 31, 2011) the date published is unknown.
JPOA—Notification of Reason for Rejection issued for corresponding Japanese Patent Application No. 2011-058996 dispatched on Aug. 26, 2014 with English translation.

\* cited by examiner

Primary Examiner — Sarai Butler
(74) Attorney, Agent, or Firm — Fujitsu Patent Center

(57) ABSTRACT

A non-transitory computer-readable medium storing wrapper program which allows an application program, having a code to call up a porting source API, to operate on a porting destination OS, the wrapper program causes a computer to execute: an error determination step of, when the porting source API is called up by the application program, referring to a porting source error condition DB, and error condition information to be output to the calling source of the porting source API satisfies the error condition information, determining whether the porting source API satisfies the error condition information of the porting source error condition DB, and outputting the corresponding error information to the application program when the error condition information is satisfied; and an API conversion step of calling up the porting destination API of the porting destination OS corresponding to the porting source API when the error condition information is not satisfied.

15 Claims, 17 Drawing Sheets

FIG. 5A

Table 21:
- QUEUE
- ID (id)
- TOTAL MEMORY SIZE OF MEMORY POOL (mz)
- AVAILABLE MEMORY SIZE OF MEMORY POOL (fz)
- OBJECT NAME
- STACK SIZE
- TASK ID
- INITIAL PRIORITY LEVEL
- CURRENT PRIORITY LEVEL
- OPERATION STATUS (ts)
- EXCLUSIVE LOCK 1 STATUS
- EXCLUSIVE LOCK 2 STATUS
- MODE INFORMATION (md)
- WAIT OBJECT ID
- NUMBER OF TIMES OF STARTING REQUEST
- NUMBER OF TIMES OF NESTING FORCED WAIT
- STACK

FIG. 5B

Table 52:
- ID (id)
- MODE INFORMATION (md)
- TASK ID
- INITIAL PRIORITY LEVEL
- OPERATION STATUS
- TASK ID
- CURRENT PRIORITY LEVEL
- OPERATION STATUS (ts)
- TOTAL MEMORY SIZE OF MEMORY POOL (mz)
- AVAILABLE MEMORY SIZE OF MEMORY POOL (fz)

COMPUTER-READABLE MEDIUM STORING WRAPPER PROGRAM AND INTEGRATED CIRCUIT APPARATUS

CROSS-REFERENCE TO RELATED APPLICATION

This application is based upon and claims the benefit of priority of the prior Japanese Patent Application No. 2011-058996, filed on Mar. 17, 2011, the entire contents of which are incorporated herein by reference.

FIELD

Embodiments discussed herein relate to a wrapper program and an integrated circuit apparatus.

BACKGROUND

Application program interfaces (hereafter API), constituted by instructions, functions and protocols for developing an application program (hereafter application) which runs on such a platform of an operating system (hereafter OS) and middleware have been provided. A user who develops an application calls up an API, which corresponds to a desired function, on a program, so as to install this function in an application.

An application developed for a specific platform cannot run on a different platform. However one of the following two methods makes it possible for an application developed for one platform to run on a different platform. The first method is rewriting an API called up by the application to be an API of a different OS of the porting destination. The second method is creating a wrapper program, which converts an API of the porting source OS into an API of the porting destination OS, and calling up the API of the porting destination OS via the wrapper program.

In the case of the first method, the API of the porting destination OS is called up directly by the application, hence overhead is low and memory capacity to be used can be minimized. The downside, however, is that the application which has been operating on the porting source OS is modified, therefore the application may have problems, and the application must be verified again.

In the case of the second method, the application need not be modified since a wrapper function, to convert the API of the porting source OS into the API of the porting destination OS, is provided. On the other hand, overhead during application execution increases, and memory capacity to be consumed becomes higher than the first method. However the application which has been operating at high reliability is not modified, hence it is easy to specify a problem area when trouble occurs. Furthermore, a wrapper program can be provided for each API, therefore man-hours can be decreased, and porting becomes more efficient compared with the first method which requires rewriting all the APIs in the application. As a consequence, the second method is more frequently used (e.g. Japanese Patent Application Laid-Open No. 2004-246690 and Personal Media Co. Ltd., "i-right/TK", searched on Jan. 31, 2011: internet url: http://www.t-engine4u.com/products/iright_tk.html).

However there are differences between a porting source OS and a porting destination OS, not only in arguments and return values of the interface in each API, but also in the error values and status values (e.g. OS mode, task status information, memory size) of each OS. This means that if the API of the porting source OS is merely converted into the API of the porting destination OS within the wrapper program, the error values and status information to be output from the API in the porting destination OS to the application may not be the same as those of the porting source OS. If the error values and status values to be output to the application are different between the porting source OS and the porting destination OS unexpected values are output from the wrapper program to the application, and the application malfunctions.

To solve this problem, it is necessary for a programmer, who is very knowledgeable about the specifications of both the porting source OS and the porting destination OS, to generate a wrapper program, and in this wrapper program, the output values of the error values and status values to the application must conform to the protocol of the porting destination OS. But if the wrapper program is programmed to convert the output values of the error values and status information so as to conform to the protocol of the porting source OS, then not only calling up the API of the porting destination OS, but also converting the output values, to indicate the processing result of the called up API (e.g. error values and status values), is required for the wrapper program, hence overhead increases and efficiency drops.

SUMMARY

In accordance with an embodiment, a non-transitory computer-readable medium storing wrapper program which allows an application program, having a code to call up a porting source application program interface of a porting source operating system, to operate on a porting destination operating system which is different from the porting source operating system, the wrapper program causes a computer to execute: an error determination step of, when the porting source application program interface is called up by the application program, referring to a porting source error condition data base, which includes error condition information of the porting source application program interface, and error condition information to be output to the calling source of the porting source application program interface where the porting source application program interface satisfies the error condition information, determining whether the porting source application program interface satisfies the error condition information of the porting source error condition data base, and outputting the corresponding error information to the application program when the error condition information is satisfied; and an application program interface conversion step of calling up the porting destination application program interface of the porting destination operating system corresponding to the porting source application program interface when the error condition information is not satisfied.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A and FIG. 5B illustrate an example of management information.

DESCRIPTION OF EMBODIMENTS

Embodiments will be described hereinafter according to the drawings. However, it is noted that the technical scope is not limited to the embodiments described below, but covers the matters described in the claims and the equivalents thereof.

Figure 1:
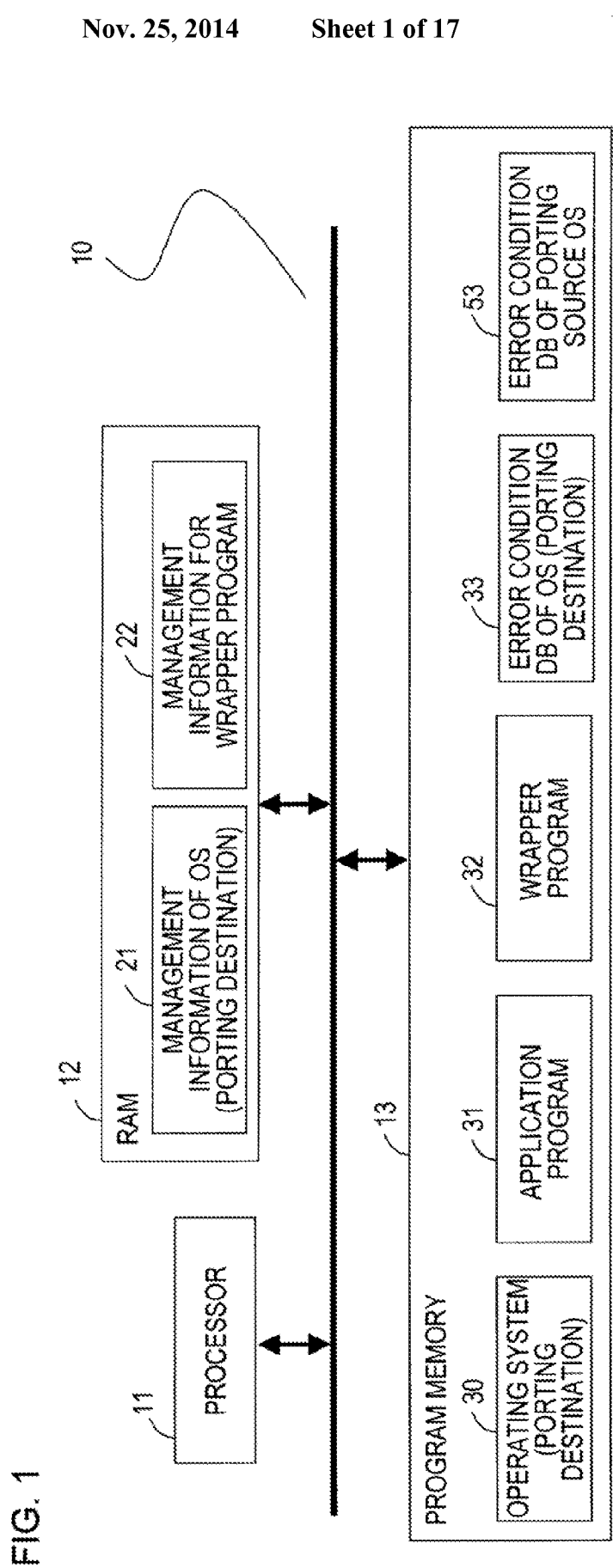
FIG. 1 illustrates an example of an integrated circuit apparatus according to the present embodiment.

FIG. 1 illustrates an example of an integrated circuit apparatus 10 according to the present embodiment. In FIG. 1, the integrated circuit apparatus 10 has a processor 11, a RAM (Random Access Memory) 12 and a program memory 13. The program memory 13 includes an operating system (hereafter porting destination OS) 30, an application program (hereafter application) 31, a wrapper program 32, an error condition data base (hereafter DB) 33 of the porting destination OS, and an error condition DB 53 of the porting source OS. The integrated circuit apparatus 10 is controlled by the porting destination OS 30.

The application 31 in FIG. 1 has a code to call up an application program interface (hereafter API) of the porting source OS, and is an application of which operation has been verified by the porting source OS. The wrapper program 32 is a program to allow the application 31 to run on the porting destination OS 30. The wrapper program 32 and the error condition DB 33 of the porting source OS in the program memory 13, and management information 21 of the porting destination OS of the RAM 12 and management information 22 for the wrapper program in RAM will be described in detail later.

Figure 2A:
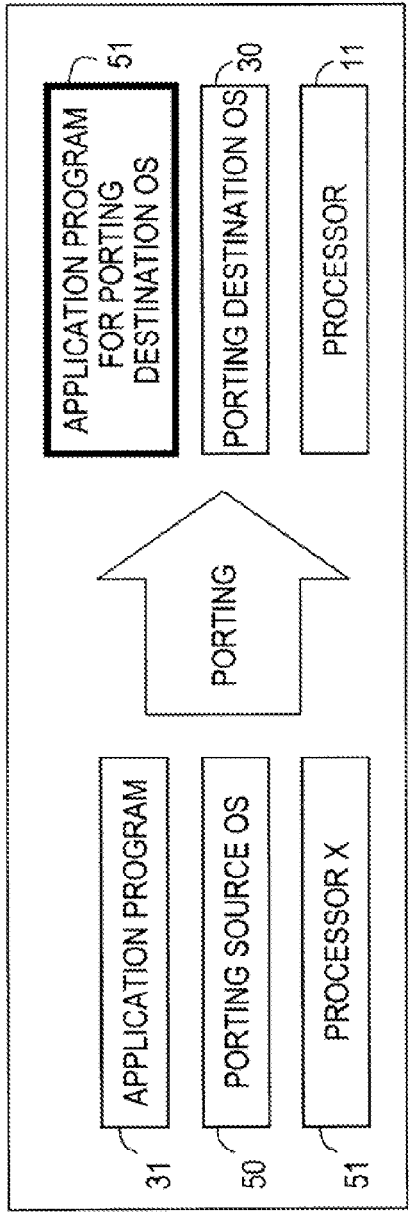
FIG. 2A and FIG. 2B illustrate two porting methods to port an application between different OSs.
Figure 2B:
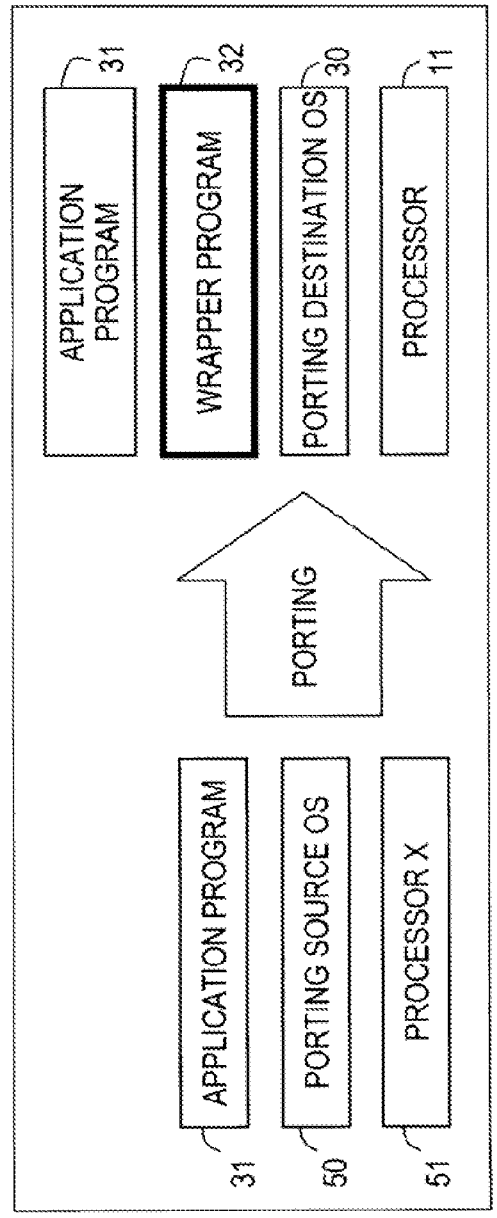

FIG. 2A and FIG. 2B illustrate two porting methods to port an application 31 between different OSs. The porting source OS 50 and the porting destination OS 30 in FIG. 2A and FIG. 2B may be integrated real-time OSs such as T-Kernel and ITRON (Industrial TRON), for example, or may be general purpose OSs such as Linux® and Windows®.

A first porting method illustrated in FIG. 2A is a method of replacing the API of the porting source OS 50 of the application 31 with the API of the porting destination OS 30, and reprogramming the application 31. In this method, the application 31, which has already been verified in the porting source OS 50, is modified, therefore a new problem could be generated in the application 31.

The second porting method illustrated in FIG. 2B is a method of operating the application 31 on the porting destination OS 30 via the wrapper program 32. According to this method, if the API of the porting source OS 50 is called up by the application 31, the API of the porting destination OS 30 corresponding to this API is called up and processed via a function, which has the same name as the API, of the wrapper program 32. Thereby the application 31 can run on the porting destination OS 30 without modifying the application 31 itself, and the man-hours required for porting and verification can be minimized, and moreover a problem area can be easily specified if trouble occurs during operation.

As a consequence, the second porting method illustrated in FIG. 2B is often used. The wrapper program 32 according to the present embodiment is related to the wrapper program 32 illustrated in FIG. 2B. The wrapper program 32 however has problems which are mentioned later. Before describing these problems, the basic operation of the wrapper program 32 mentioned here will be described first.

Figure 3:
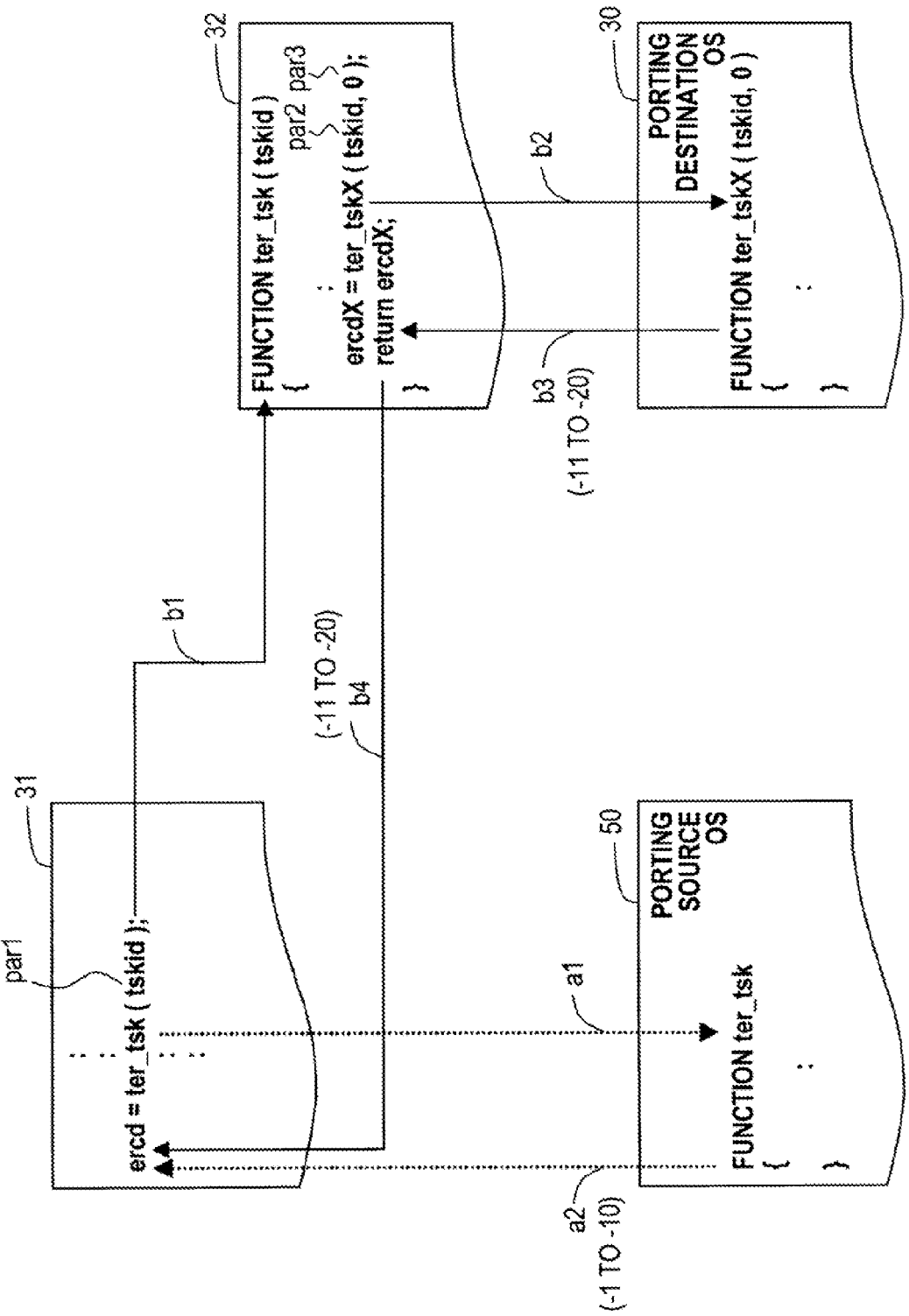
FIG. 3 illustrates a basic operation of the wrapper program.

FIG. 3 illustrates a basic operation of the wrapper program 32. In this example, the application 31 has a code to call up a function ter_tsk, which is the API of the porting source OS 50. The function has an argument par1, which is used for processing this function, and a return value (e.g. ercd), where the processing result is output, and a number of arguments and a presence of a return value are different depending on the function. The function ter_tsk in FIG. 3 is a function to end a task specified by the argument par1 (e.g. tskid), and is written as "return value=ter_tsk (argument);" in the code of the program. In the example in FIG. 3, a variable tskid, which has a positive identification value to indicate a task to be ended, is specified for the argument par1 of the function ter_tsk. Then a variable ercd is specified for the return value of the function ter_tsk. For example, if a minus value is output to the variable ercd as a result of processing the function ter_tsk, this means that an error is generated in the function ter_tsk.

In the case of the application 31 running on the porting source OS 50, if the function ter_tsk is called up by the application 31, as illustrated in the left portion of FIG. 3, the function ter_tsk is called up from the library in the porting source OS 50, and processing is performed (a1). Then the processing result is output to the application 31 as the return value ercd (a2).

In the case of the application 31 running on the porting destination OS 30, on the other hand, the function is processed via the wrapper program 32, as illustrated in the right portion of FIG. 3. The wrapper program 32 has a function ter_tsk which has the same name as the API of the porting source OS 50, and the program calls up the API function ter_tskX (return ercdX) of the porting destination OS, which corresponds to the API function ter_tsk of the porting source OS 50, in the function ter_tsk having the same name. Thus the function ter_tskX is called up (b2) via the function having the same name as the function of the wrapper program 32 (b1), and the function ter_tskX is processed by the porting destination OS 30. Then the return value ercdX, which is output as a result of processing the function ter_tskX (b3), is output to the application 31 via the function having the same name of the wrapper program 32 (b4).

In some cases, the interface of the API of the porting source OS 50 and that of the API of the porting destination OS 30 may be different. In this case as well, the function ter_tsk of the porting source OS 50 has one argument (par1), while the function ter_tskX of the porting destination OS has two arguments (par2, par3), that is, each interface of the API is different from each other. In concrete terms, an identification value to indicate a task to be ended, which is specified in the argument par1 by the function ter_tsk of the porting source OS 50 is specified in the same way in the first argument par2 of the function ter_tskX, and a value to indicate whether or not a task, not specified in the function ter_tsk, force quits, is specified in the second argument par3. Thus the interface of the API may be different depending on the OS. In such a case, the wrapper program 32 calls up the API of the porting destination OS 30, so that the processing content becomes substantially the same as the processing content of the API of the porting source OS 50. In this example, "0", which indicates that force quit is not specified, is specified in the second argument par3 of the function ter_tskX.

Furthermore, in some cases protocols may be different not only in the interface, but also in the error values to be output as the return values, between the API of the porting source OS 50 and the API of the porting destination OS 30. For example, if an error occurs, one of the error values "−1 to −10" is output as the return value ercd in the case of the API function ter_tsk of the porting source OS 50 (a2 in FIG. 3), whereas one of the error values "−11 to −20" is output as the return value ercdX in the case of the API function ter_tskX of the porting destination OS 30 (b3 and b4 in FIG. 3).

Therefore in the case of the application 31 running on the porting source OS 50, if an error occurs, one of the error values −1 to −10 is output based on the protocol of the error values of the porting source OS 50. Whereas in the case of the application 31 running on the porting destination OS 30, if an error occurs, one of the error values −11 to −20 is output based on the protocol of the error values of the porting destination OS 30. In other words, if the protocol of error values of the porting source OS 50 is different from that of the porting destination OS 30, the return value to be output from the API to the application 31 is different depending on which OS, of the porting source OS 50 and porting destination OS 30, the application 31 is running.

Moreover in the application 31, the subsequent processing is often controlled based on the return value from the API. However the application 31 in FIG. 3 has been programmed based on the protocol of error values of the porting source OS 50, hence in the case of the application 31 running on the porting destination OS 30, if an error value based on the protocol of the porting destination OS 30 is output from the API, the subsequent processing is not controlled as intended, and an appropriate processing is not performed by the application 31. Therefore in the case of the application 31 running on the porting destination OS 30, it is demanded that a return value based on the same protocol as the porting source OS 50 is output from the API.

First Embodiment

Before describing the processing of the wrapper program 32 according to the first embodiment, a detailed processing flow of a conventional wrapper program 32 and a porting destination OS 30 will be described with reference to a flow chart.

Figure 4:
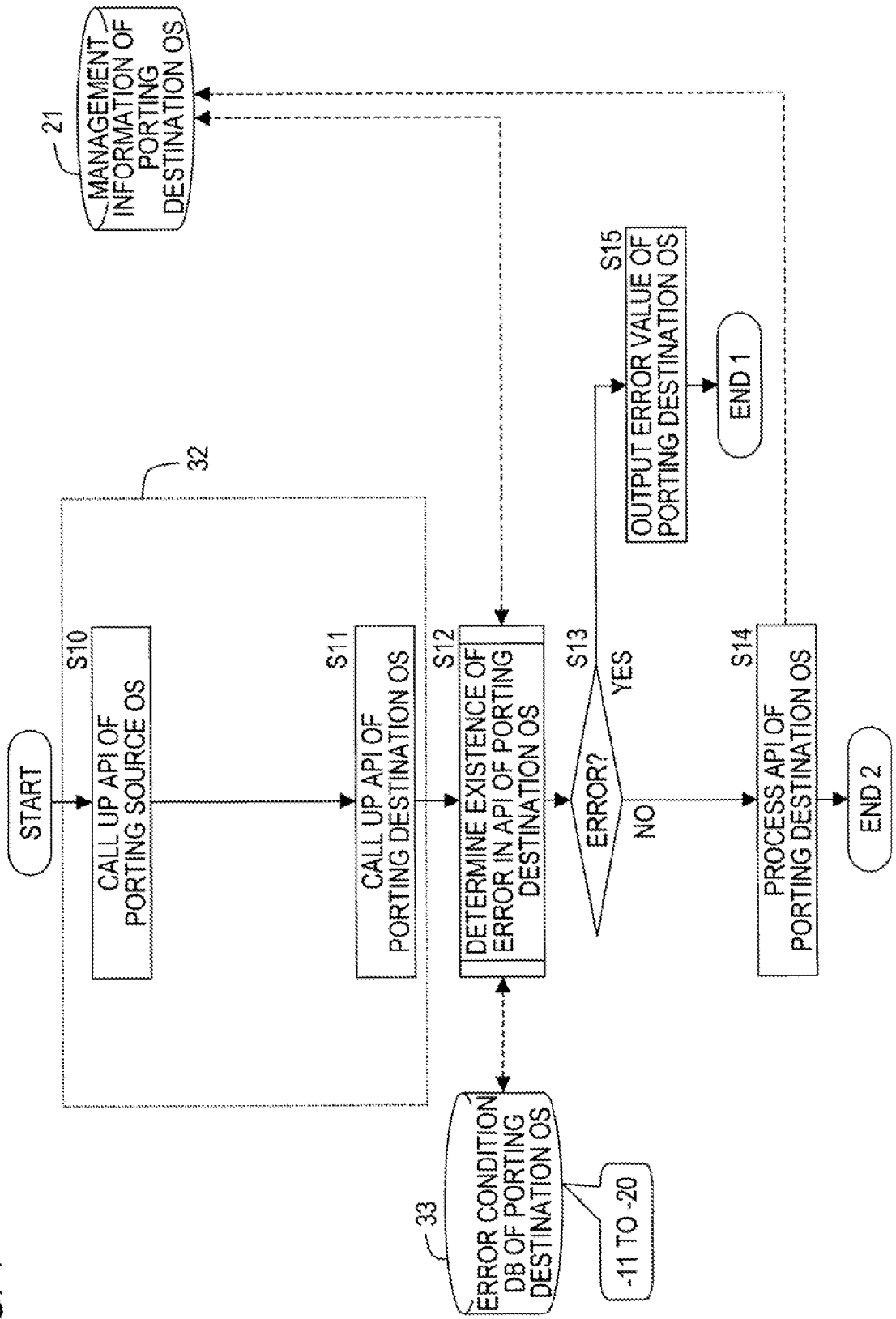
FIG. 4 is a flow chart illustrating a detailed processing flow of a conventional wrapper program and a porting destination OS.

FIG. 4 is a flow chart illustrating a detailed processing flow of a conventional wrapper program 32 and a porting destination OS 30. In FIG. 4, the processings enclosed by the dotted line (S10 and S11) are processings of a conventional wrapper program, and the other processings (S12 to S14) are processings of a porting destination OS 30. As mentioned in FIG. 3, if the API of the porting source OS 50 is called up by the application 31 (S10), the API of the porting destination OS 30, corresponding to the API of the porting source OS 50, is called up via a function having the same name in the wrapper program 32 (S11).

To process the API of the porting destination OS 30 which was called up, the porting determination OS 30 determines whether this API is in a processible state with reference to the error condition DB 33 and the management information 21 of the porting destination OS (S12). Here it is determined whether this API is in a processible state based on the format of arguments of the API function, range of argument values and state of OS, for example. Before describing the error determination processing in step S12, the error condition DB 33 and the management information 21 of the porting destination OS, which are referred to in the error determination processing, will be described.

The error condition DB 33 of the porting destination OS is a DB having error condition information of each API of the porting destination OS 30 and error values which are output when each API satisfies the error conditions, and is written in a function macro, for example. In the case of an API function ter_tskX, for example, the error condition DB 33 of the porting destination OS has such information as: outputting a predetermined error value (e.g. −11 in this embodiment) if a minus value is specified in the argument tskid where a positive value must be specified; and outputting a predetermined error value (e.g. −12 in this embodiment) if a number of arguments is insufficient.

The management information 21 of the porting destination OS has status values to indicate the status of the OS including operation status and ID information of each task on the OS, memory pool size information and mode information. Each status value is updated mostly during API processing, and is always maintained in the latest status. The above mentioned error condition DB 33 of the porting destination OS also has error condition information based on status values. In the case of the function ter_tskX, for example, the error condition is satisfied if the status value to indicate the operation status of a task to be ended, specified in the argument tskid, is in non-operation status. In this case, a predetermined error value (e.g. −13 in this embodiment) is output based on the error condition information.

FIG. 5A and FIG. 5B illustrate an example of management information. FIG. 5A is management information 21 of the porting destination OS, and FIG. 5B is management information 52 of the porting source OS. As FIG. 5A illustrates, the management information 21 of the porting destination OS has, for example, status values to indicate the ID information id of an OS, operation status ts of each task, memory pool size information mz and fz, and mode information md. The management information 52 of the porting source OS in FIG. 5B will be described later in the third and fourth embodiments.

Figure 6:
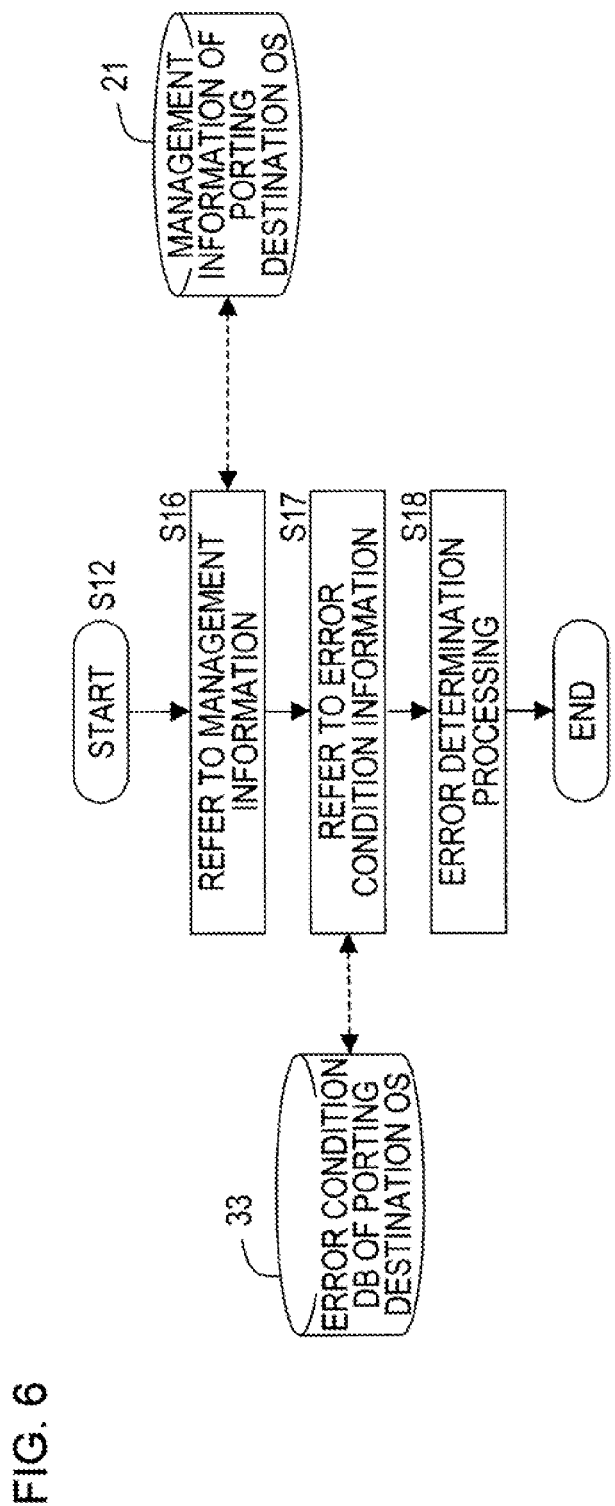
FIG. 6 is a flow chart illustrating the error determination processing in step S12 in FIG. 4.

FIG. 6 is a flow chart illustrating the error determination processing in step S12 in FIG. 4. In concrete terms, the porting destination OS 30 obtains status values related to the API of the porting destination OS 30 with reference to the management information 21 as illustrated in FIG. 5A and FIG. 5B (S16). In the case of function ter_tskX, for example, the porting destination OS 30 refers to the management information 21 of the porting destination OS in FIG. 5A and FIG.

5B, and obtains a status value ts to indicate an operation status of a task to be ended, specified in the argument tskid. Then the porting destination OS 30 refers to the error condition DB 33 of the porting destination OS based on the obtained status value, and determines whether the API satisfies an error condition. The porting destination OS 30 can refer to the management information 21 only when a status value related to the API exists. Thus the porting destination OS 30 can determine whether the API of the porting destination OS 30 is in a processable state by referring to the management information 21 of the OS and the error condition DB 33.

According to the flow chart in FIG. 4, if an error condition is satisfied as a result of the error determination (YES in S13), the porting destination OS 30 outputs an error value corresponding to the error condition to the wrapper program 32 as a return value, based on the error condition DB 33. If no error condition is satisfied (NO in S13), the porting destination OS 30 performs the API processing, and outputs the processing result to the wrapper program 32 as a return value (S14). Then the return value is output to the application 31 via the wrapper program 32. Thus the conventional wrapper program 32 enables an application 31 having a code to call up the API of the porting source 50 to operate on the porting destination OS 30.

However as mentioned in FIG. 3, the porting source OS 50 and the porting destination OS 30 may have different protocols of status values and error values which are output as a processing result of the API. In this case, even if a same error condition is satisfied, the API of the porting source OS 50 and the corresponding API of the porting destination OS 30 output different error values. As a result, when the application 31 runs on the porting destination OS 30, the processing of the application 31 becomes unstable. An example of this state will be described with reference to a flow chart.

Figure 7:
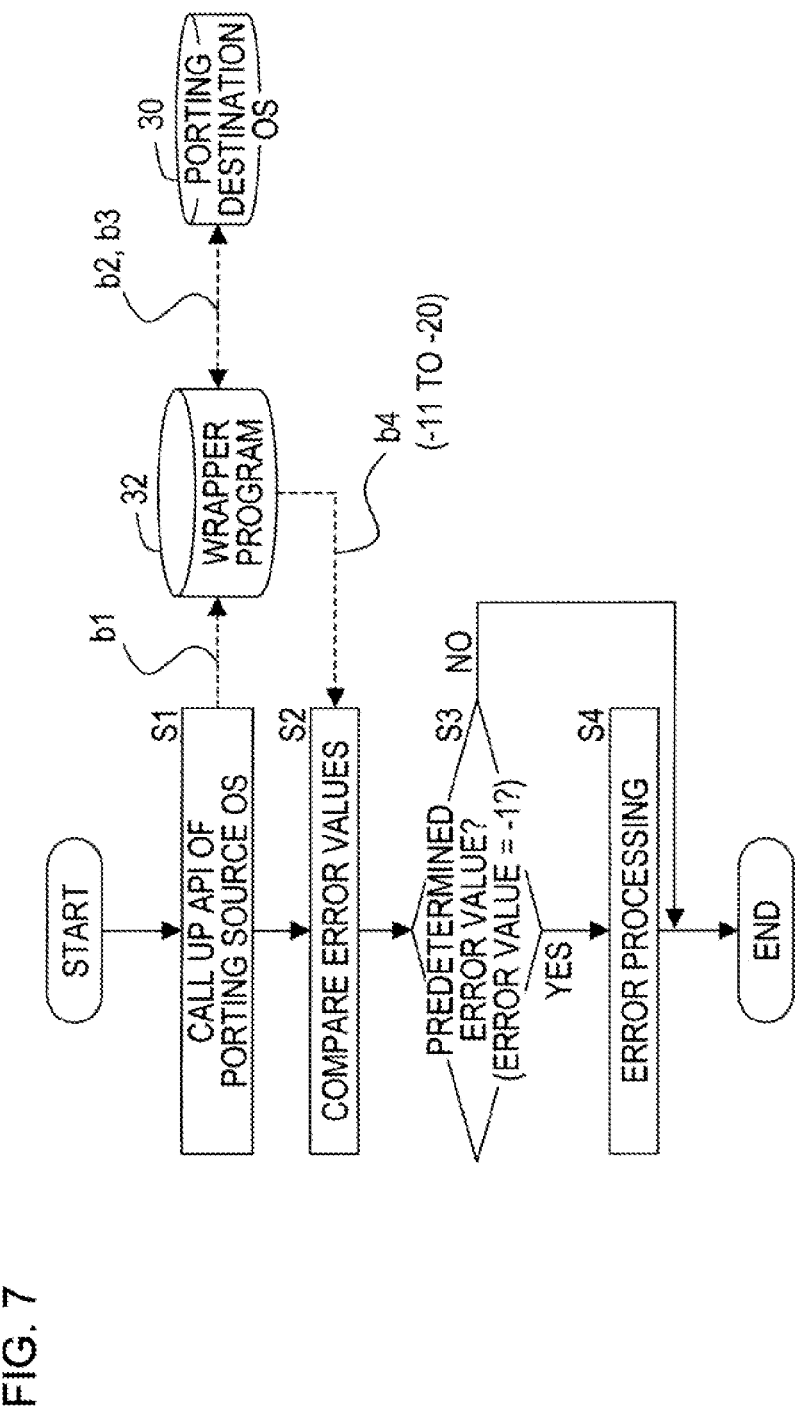
FIG. 7 is a flow chart illustrating an example of processing of the application.

FIG. 7 is a flow chart illustrating an example of processing of the application 31. If the application 31 calls up a function ter_tsk of the porting source OS 50 (S1), for example, the function ter_tskX of the porting destination OS is processed by the porting destination OS 30 via the wrapper program 32 (b1 to b3), and the processing result is output to the application 31 as a return value (S2, b4). Then the application 31 determines whether the return value is a predetermined error value (S3).

According to this example, if an error value to indicate that an invalid value is specified in the argument is output in step S3 (YES in S3), the error processing (S4) is performed. If an invalid value is specified in the argument of the function ter_tsk, an error value −1 is output in the porting source OS 50 based on the protocol of the porting source OS 50. Therefore in this example, it is determined whether the return value is −1 or not in step S3.

In the porting destination OS 30 however, if an invalid value is specified in the argument of the function ter_tskX, −11 is output based on the protocol of the porting destination OS 30. Hence if the application 31 runs on the porting destination OS 30, error processing (S4) is not performed even if an invalid value is specified in the argument, since the error value is different from −1. Thus in the case of the application 31 running on the porting destination OS 30, processing becomes different from that in the case of the application 31 running on the porting source OS 50 because of the difference of the protocols of the error values in each OS.

Therefore according to the first embodiment, when an API of the porting source OS 50 is called up by the application 31, the wrapper program 32 refers to the error condition DB 53 of the porting source OS, determines whether the porting source API satisfies the error condition information of the porting source error condition DB 53, and outputs the corresponding error information to the application 31 if the condition information is satisfied. If the API does not satisfy the error condition information, the wrapper program 32 calls up the API of the porting destination OS 30 which corresponds to the API of the porting source OS 50.

Figure 8:
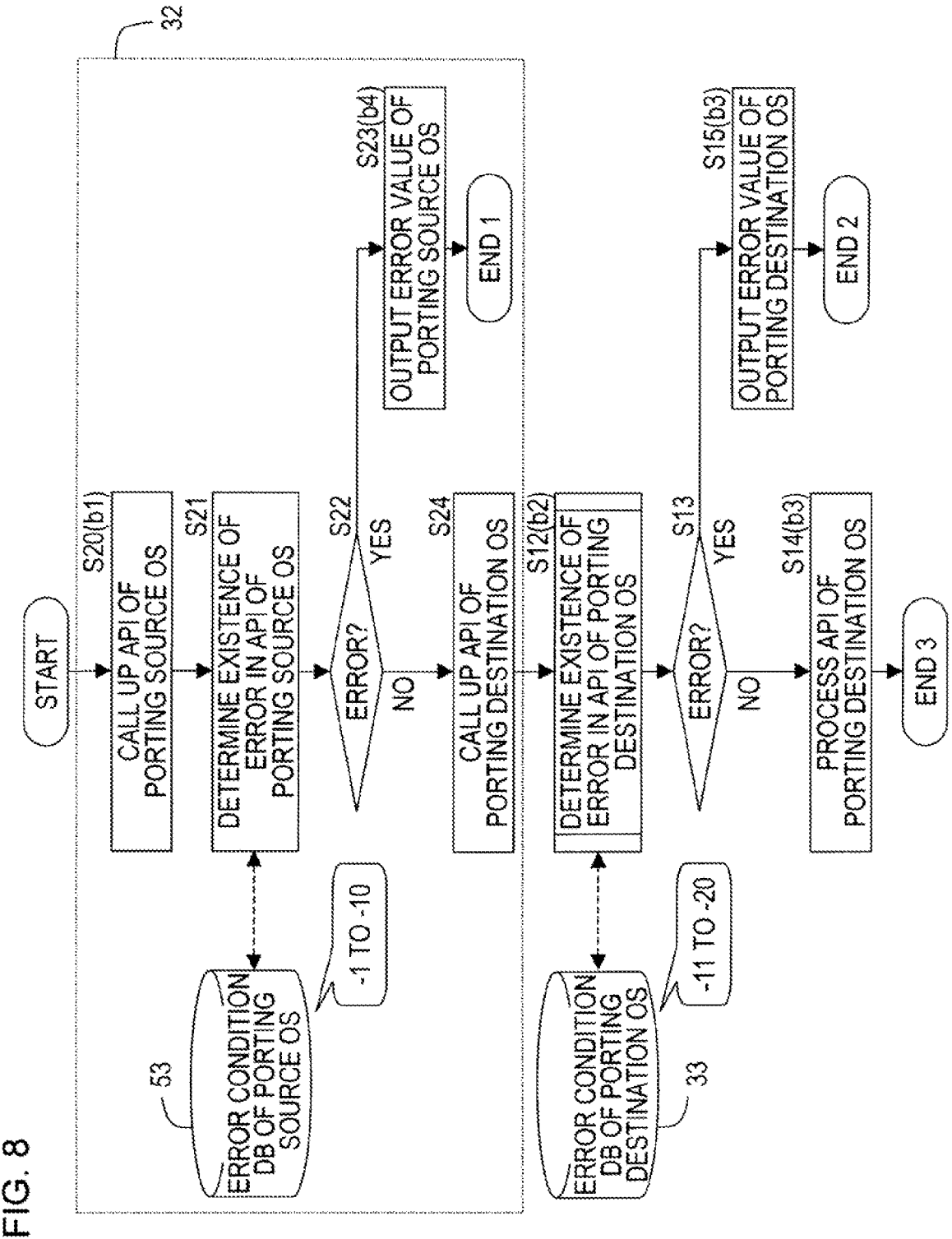
FIG. 8 is a flow chart illustrating the processing flow of the wrapper program and the porting destination OS according to the first embodiment.

FIG. 8 is a flow chart illustrating the processing flow of the wrapper program 32 and the porting destination OS 30 according to the first embodiment. FIG. 8 corresponds to FIG. 4 which illustrates processing of the a conventional wrapper program. In FIG. 8, the processings enclosed by the dotted line (S20 to S24) are processings by the wrapper program 32, and the other processings (S25 to S28) are processings by the porting destination OS 30. The wrapper program 32 according to the present embodiment has an error condition DB 53 of the porting source OS, and refers to the error condition DB 53 for the API of the porting source OS 50 before calling up the API of the porting destination OS 30 which corresponds to the API of the porting source OS 50, and performs the error determination processing. If an error condition is satisfied, the wrapper program 32 makes it unnecessary to call up the API of the porting destination OS 30 so as to increase the processing speed, and also to enable output of an error value to the application based on the protocol of the porting source OS 50. This aspect will be described in concrete terms.

The error condition DB 53 of the porting source OS has error condition information of each API of the porting source OS 50, and error values in the case when the API satisfies the error conditions. In the case of the function ter_tsk, for example, the error condition DB 53 of the porting source OS has such information as: outputting a predetermined error value (e.g. −1 in this embodiment) if a minus value is specified in the argument tskid where a positive value must be specified; outputting a predetermined error value (e.g. −2 in this embodiment) if a number of arguments is insufficient; and outputting a predetermined error value (e.g. −3 in this embodiment) if the status value to indicate an operation status of a task to be ended, specified for the argument tskid, is a non-operation status.

As mentioned above, in the case of the function ter_tskX, on the other hand, the error condition DB 33 of the porting destination OS has such information as: outputting an error value −11 if a minus value is specified in the argument tskid; outputting an error value −12 if a number of arguments is insufficient; and outputting an error value −13 if the argument tskid indicates a non-operation status. In other words, the protocol of error values is different depending on the OS.

In the flow chart in FIG. 8, if the API of the porting source OS 50 is called up by the application 31 (S20, b1 in FIG. 3), the wrapper program 32 of the present embodiment refers to the error condition DB 53 of the porting source OS, and determines whether the API of the porting source OS 50, which was called up, satisfies an error condition 34 of the porting source OS (S21).

If an error condition is satisfied (YES in S22), the wrapper program 32 outputs the error value based on the error condition DB 53 of the porting source OS to the application 31 as a return value. Therefore according to the flow chart in FIG. 8, an error value conforming to the same protocol as the case of running on the porting source OS 50 is output to the application 31 as a return value (S23, b4 in FIG. 3). Moreover if an error condition is satisfied, the wrapper program 32 of the present embodiment does not call up the API of the porting destination OS 30 corresponding to the API of the porting source OS 50. Thus if an error condition is satisfied, the application 31 makes it unnecessary to call up the API of the porting destination OS 30 so as to increase the processing speed, and enable output of the error value conforming to the protocol of the porting source OS 50 to the application.

If no error condition is satisfied (NO in S22), the wrapper program 32 calls up the API of the porting destination OS 30 corresponding to this API (S24, b2 in FIG. 3). The processing after the API of the porting destination OS is called up (S12 to S15) is the same as that in the flow chart in FIG. 4.

The processings in the flow chart in FIG. 8 will be described in more concrete terms based on the function ter_tsk illustrated in FIG. 3. In this case, an invalid value is specified for the argument tskid of the function ter_tsk of the porting source OS called up by the application 31.

If the function ter_tsk is called up by the application 31 (S20 in FIG. 8, b1 in FIG. 3), the wrapper program 32 of the present embodiment refers to the error condition DB 53 of the porting source OS, and determines whether the function ter_tsk has an error (S21). Since the error condition that an invalid value is specified in the argument tskid is satisfied here (YES in S22), the wrapper program 32 outputs the error value −1 to the application 31 based on the error condition DB 53 of the porting source OS (S23, b4). This return value −1 is based on the error condition DB 53 of the porting source OS, hence this return value −1 is the same as the return value in the case of the application 31 running on the porting source OS 50. As a consequence, even if the application 31 is running on the porting destination OS 30, the same return value as the case of running on the porting source OS 50 is output, and the application 31 can determine the subsequent processing based on the return value.

Thus according to the present embodiment, the wrapper program 32 refers to the error condition DB 53 of the porting source OS before calling up the API of the porting destination OS 30 corresponding to the API of the porting sources OS 50 which was called up by the application 31, and determines whether the API of the porting source OS 50 has an error. Thereby if the API of the porting source OS satisfies an error condition of the error condition DB 53 of the porting source OS, the wrapper program 32 can output a return value conforming to the same protocol as the porting source OS 50 to the application 31. Since the wrapper program 32 performs the error determination processing before calling up the corresponding API of the porting destination OS 30, the wrapper program 32 can make it unnecessary to call up the API of the porting destination OS 30 when an error condition is satisfied, so as to increase processing speed.

Thus even if the protocol of error information of the porting source OS 50 and that of the porting destination OS 30 are different, the wrapper program 32 according to the present embodiment can efficiently output error information conforming to the same protocol as the porting source OS 50 to the application 31. Therefore it is unnecessary to add or modify the determination processing conforming to the protocol of the porting destination OS 30 or to the application 31 which has been programmed based on the protocol of the error information of the porting source OS 50. The wrapper program performs error determination processing based on the error conditions of the error condition DB 53 of the porting source OS, hence it is unnecessary to create a new means of converting the error information conforming to the protocol of the porting source OS into that conforming to the protocol of the porting destination OS. Since the application 31, which has already been verified in the porting source OS 50, can run on the porting destination OS 30 without making any modifications, man-hours to port the application 31 can be decreased.

Second Embodiment

Figure 9:
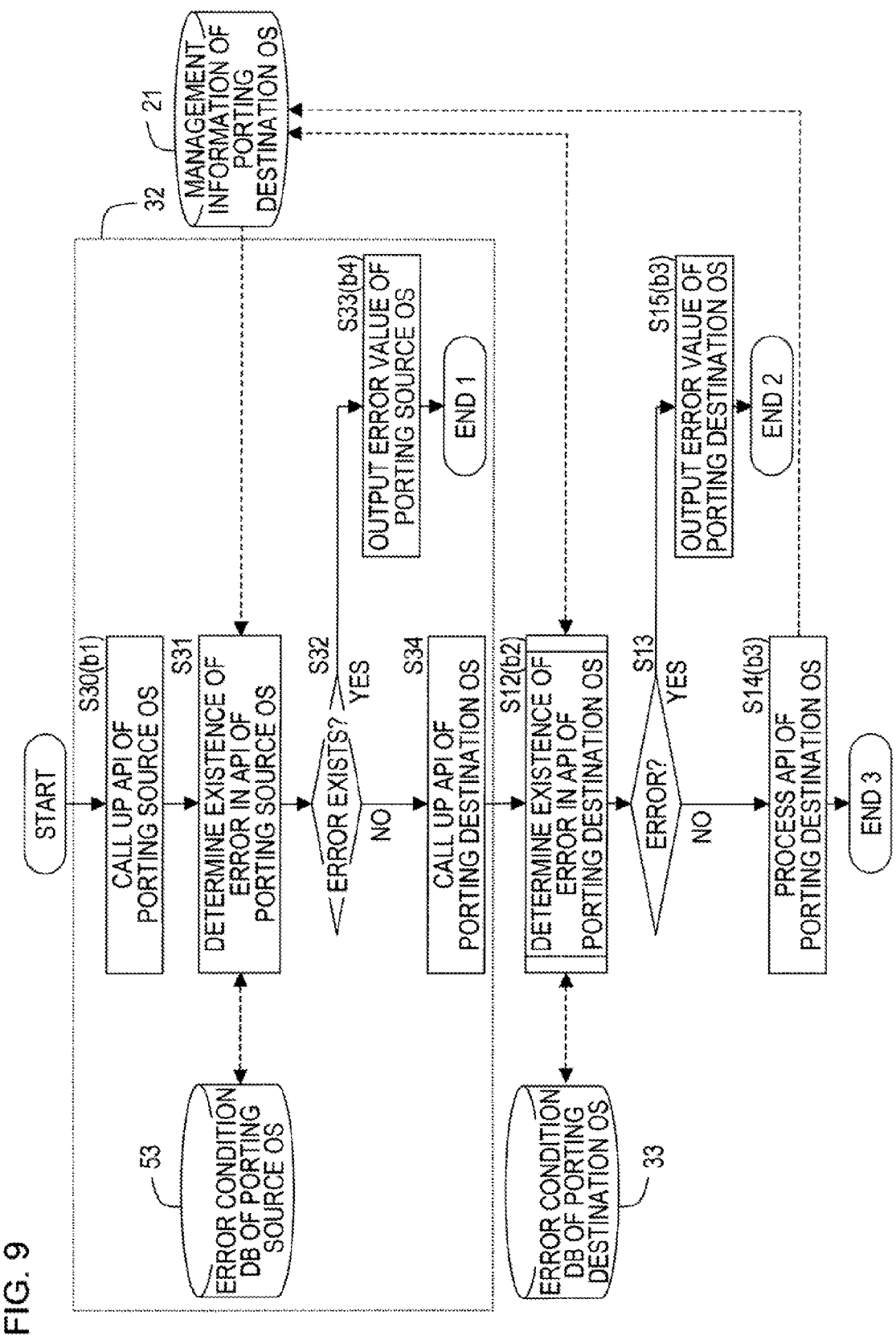
FIG. 9 is a flow chart illustrating a processing flow of the wrapper program and porting destination OS according to the second embodiment.

According to the first embodiment, the wrapper program 32 refers to the error condition DB 53 of the porting source OS, and determines whether the API of the porting source OS 50 has an error before calling up the API of the porting destination OS 30, corresponding to the API of the porting source OS 50. Whereas according to the second embodiment, the wrapper program 32 refers to the management information 21 of the porting destination OS as well, and determines whether the API of the porting source OS 50 has an error, as illustrated in FIG. 9. Thereby the wrapper program 32 can determine whether an error exists in the API has no error based on the status of the OS 30 to be the operation environment.

FIG. 9 is a flow chart illustrating a processing flow of the wrapper program 32 and porting destination OS 30 according to the second embodiment. Just like FIG. 8, processings enclosed by the dotted line (S30 to S34) are processings by the wrapper program 32, and the other processings (S12 to S15) are processings by the porting destination OS 30.

If the API of the porting source OS 50 is called up by the application 31 (S30), the wrapper program 32 of the present embodiment refers to the management information 21 of the porting destination OS in addition to the error condition DB 53 of the porting source OS, and determines whether this API satisfies an error condition 34 of the porting source OS (S31). The flow of the error determination processing is the same as the flow chart in FIG. 6. The wrapper program 32 of the present embodiment performs error determination processing as follows based on the management information 21 of the porting destination OS and the error information DB 34 of the porting source OS.

First the wrapper program 32 according to the present embodiment refers to the management information 21 of the porting destination OS, and obtains status values related to the API of the porting source OS which were called up. The wrapper program 32 refers to the management information 21 of the porting destination OS illustrated in FIG. 5A, and obtains status values related to the API, such as the task operation status ts and mode information and of the OS. Then the wrapper program 32 refers to the error condition DB 53 of the porting source OS based on the obtained status values, and determines whether the API satisfies the error condition. The processings after the error determination step (S33, S34, S12 to S15) are the same as the first embodiment.

Thereby the wrapper program 32 can output an error value conforming to the protocol of the error values of the porting source OS 50 to the application 31, according to the status value based on the status of the OS 30 in the operation environment. Now the processing of the flow chart in FIG. 9 will be described in detail with reference to a concrete example of the API.

Figure 10:
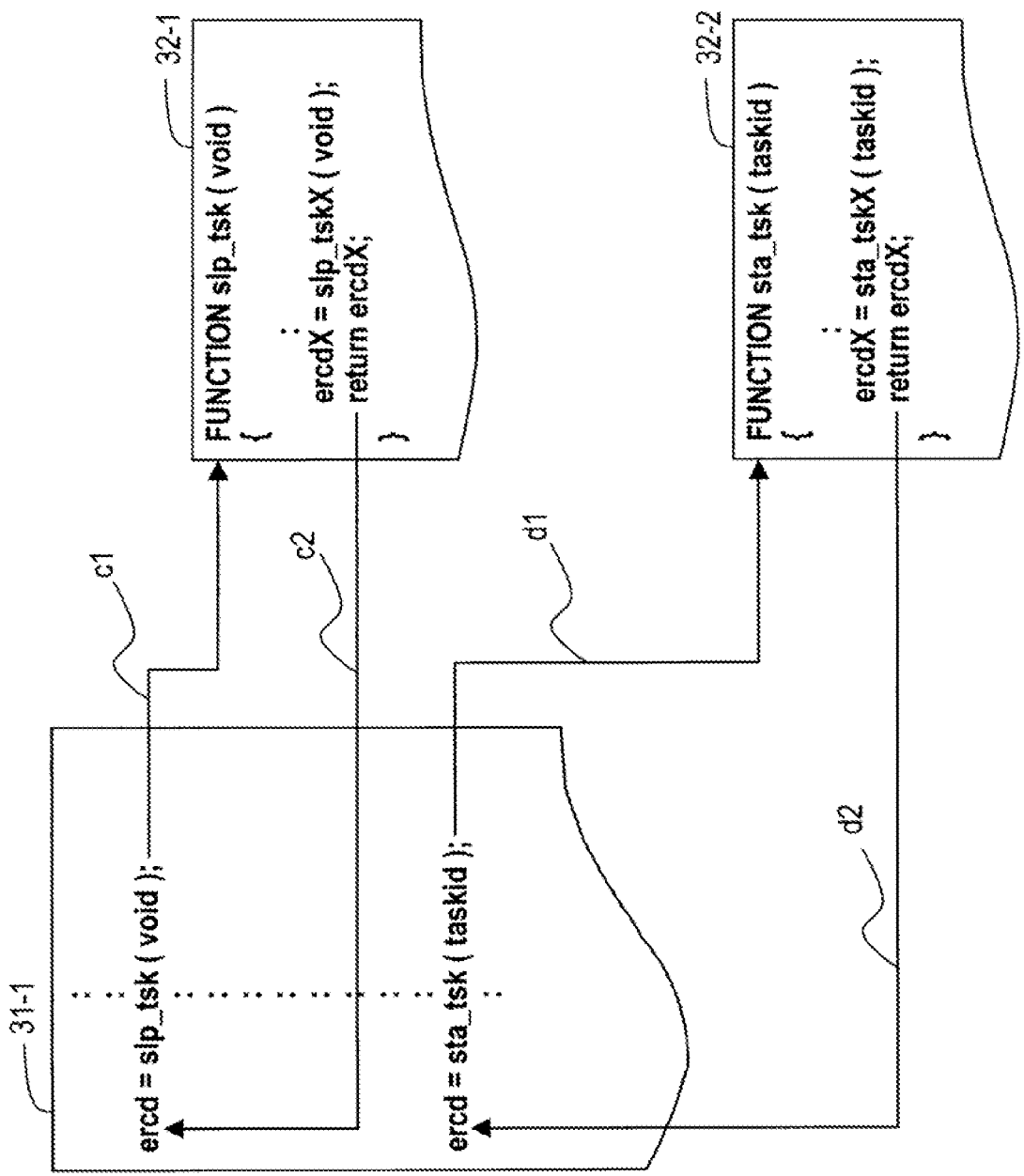
FIG. 10 illustrates an example of the wrapper program.

FIG. 10 illustrates an example of the wrapper program 32. In this example, an application 31-1 has a code to call up a function slp_tsk, which is an API of the porting source OS 50. The function slp_tsk is a function to set the self task (task which issued the API) to the wait status (sleep status: sip), which is written in program code as "return value=slp_tsk (void . . . no argument);"). An error occurs if the function slp_tsk is processed when the OS is in dispatch disabled (task switching disabled) mode. A wrapper program 32-1, which corresponds to the function slp_tsk of the porting source OS 50, calls up an API function slp_tskX of the porting destination OS 30.

As FIG. 9 illustrates, if the function slp_tsk of the porting source OS 50 is called up by the application 31 (S30 in FIG. 9, c1 in FIG. 10), the wrapper program 32 of the present embodiment refers to the error condition DB 53 of the porting source OS and the management information 21 of the porting destination OS, and determines whether the function slp_tsk has an error (S31). In this example, the porting destination OS 30 on which the application 31 is to run is in the dispatch disabled mode at this time.

Then the wrapper program 32 refers to the management information 21 of the porting destination OS, and obtains an identification value of the self task and mode information of the OS, which are status values related to the function slp_tsk. In this case, the wrapper program 32 refers to the management information 21 of the porting destination OS, and obtains the mode information of the OS, which indicates the dispatch disabled mode. As mentioned above, the dispatch disabled mode satisfies an error condition (YES in S32), therefore the wrapper program 32 outputs a predetermined error value corresponding to this error condition to the application 31 based on the error condition DB 53 of the porting source OS (S33 in FIG. 9, c2 in FIG. 10). Since the error value is a value based on the error condition DB 53 of the porting source OS, the protocol is the same as that of the error value in the case of the application 31 running on the porting source OS 50. Therefore even if the application 31 runs on the porting destination OS 30, the application 31 can perform error determination processing based on a return value conforming to the same protocol as the porting source OS 50.

Thus the wrapper program 32 of the present embodiment refers to the error condition DB 53 of the porting source OS based on the status values obtained by referring to the management information 21 of the porting destination OS before calling up the API of the porting destination OS 30 corresponding to the API of the porting source OS 50 which was called up by the application 31, and determines whether the API of the porting source OS 50 has an error based on the status of OS 30 to be the operation environment. If an error condition is satisfied, the wrapper program 32 outputs an error value corresponding to this error condition of the error condition DB 53 of the porting source OS to the application 31.

Thereby for the API of the porting source OS 50 which was called up, the wrapper program 32 can perform not only the standard error determination according to the first embodiment, but also error determination processing based on the state of the porting destination OS 30 to be the operation environment, and can output a return value conforming to the same protocol as the porting source OS 50 to the application 31.

As described above, even if the protocol of error information of the porting source OS 50 and that of the porting destination OS 30 are different, the wrapper program 32 of the present embodiment can efficiently output the error information conforming to the same protocol as the porting source OS 50 to the application 31. As a consequence, the application 31, which has already been verified in the porting source OS 50, can run on the porting destination OS 30 without making any modifications, and the man-hours to port the application 31 can be decreased.

Third Embodiment

According to the second embodiment, the wrapper program 32 refers to the error condition DB 53 of the porting source OS and management information 21 of the porting destination OS, and determines whether the API of the porting source OS 50 has an error. Whereas according to the third embodiment, the wrapper program 32 refers to the error condition DB 53 of the porting source OS and management information 22 for the wrapper program, generated and updated based on the management information 21 of the porting destination OS, so as to conform to the protocol of the status values of the porting source OS, and determines whether the API of the porting source OS 50 has an error. Thereby the wrapper program 32 can determine whether the API has an error based on the status of the OS to be the operation environment, even if the protocol of the status values of the porting source OS 50 and that of the porting destination OS 30 are different.

The above mentioned FIG. 5A and FIG. 5B illustrate the management information 21 of the porting destination OS in FIG. 5A and the management information 52 of the porting source OS in FIG. 5B. However the meaning (protocol) of each status value may be different depending on the OS. This aspect will be described using the operation status ts of the management information in FIG. 5A and FIG. 5B as an example.

In the management information 52 of the porting source OS in FIG. 5B, a status value to indicate an operation status ts of a task, for example, has one of the following four values: "stop status=0/operating status=1/operable status=2/wait status=3". Whereas in the management information 21 of the porting destination OS in FIG. 5A, a status value to indicate an operation status ts of a task has one of the following five values: "stop status=1/operating status=0/operable status=2/wait status=3/forced wait status=4". Thus the status values to indicate "stop status" and "operating status" of the porting destination OS 30 and those of the porting source OS 50 are different, and the management information 21 of the porting destination OS includes a value of the operation status ts, which does not exist in the porting source OS 50 (forced wait status=4).

The management information 21 of the porting destination OS conforms to the protocol of the status values of the porting destination OS 30, and the error condition DB 53 of the porting source OS conforms to the protocol of the status values of the porting source OS 50. If the protocol of the status values of the porting destination OS 30 and that of the porting source OS 50 are different, the wrapper program 32 cannot determine whether an error condition in the error condition DB 53 of the porting source OS is satisfied or not, based on the status values obtained by referring to the management information 21 of the porting destination OS, which is the OS to be the operation environment. As a concrete example, a case of an error condition being satisfied when a processing target task is in stop status will be described. In this case, according to the management information 21 of the porting source OS, an error condition is satisfied if the status value to indicate the status of the task is "stop status=1". In the porting source OS however, the status value "1" to indicate the status of the task means the operating status, therefore does not satisfy an error condition according to the error condition DB 53.

Therefore to solve the problem, the wrapper program 32 according to the present embodiment generates management information 22 for the wrapper program, having each status value of the management information 21 of the porting destination OS, which has been corrected so as to conform to the protocol of each status value of the management information 52 of the porting source OS. In concrete terms, in order to conform to the protocol of the porting source OS 50, the wrapper program 32 generates the management information 22 for the wrapper program, where if the status value to indicate the operation status of the porting destination OS 30 is "stopping status=1", the value has been corrected to the status value "0", which indicates the stop status in the porting source OS, and if "operating status=0", the value has been corrected to the status value "1", which indicates the operating status in the porting source OS. If the porting source OS 50 does not have a status value, the wrapper program 32 corrects the value to a value of which meaning is closest. For example, in the case of the status value "forced wait status=4" of the porting destination OS 30 which the porting source OS 50 does not have, the wrapper program 32 regards this status as "wait status" in a wide sense, and corrects the status value to the status value "wait statue=3" of the porting source OS 50.

Figure 11:
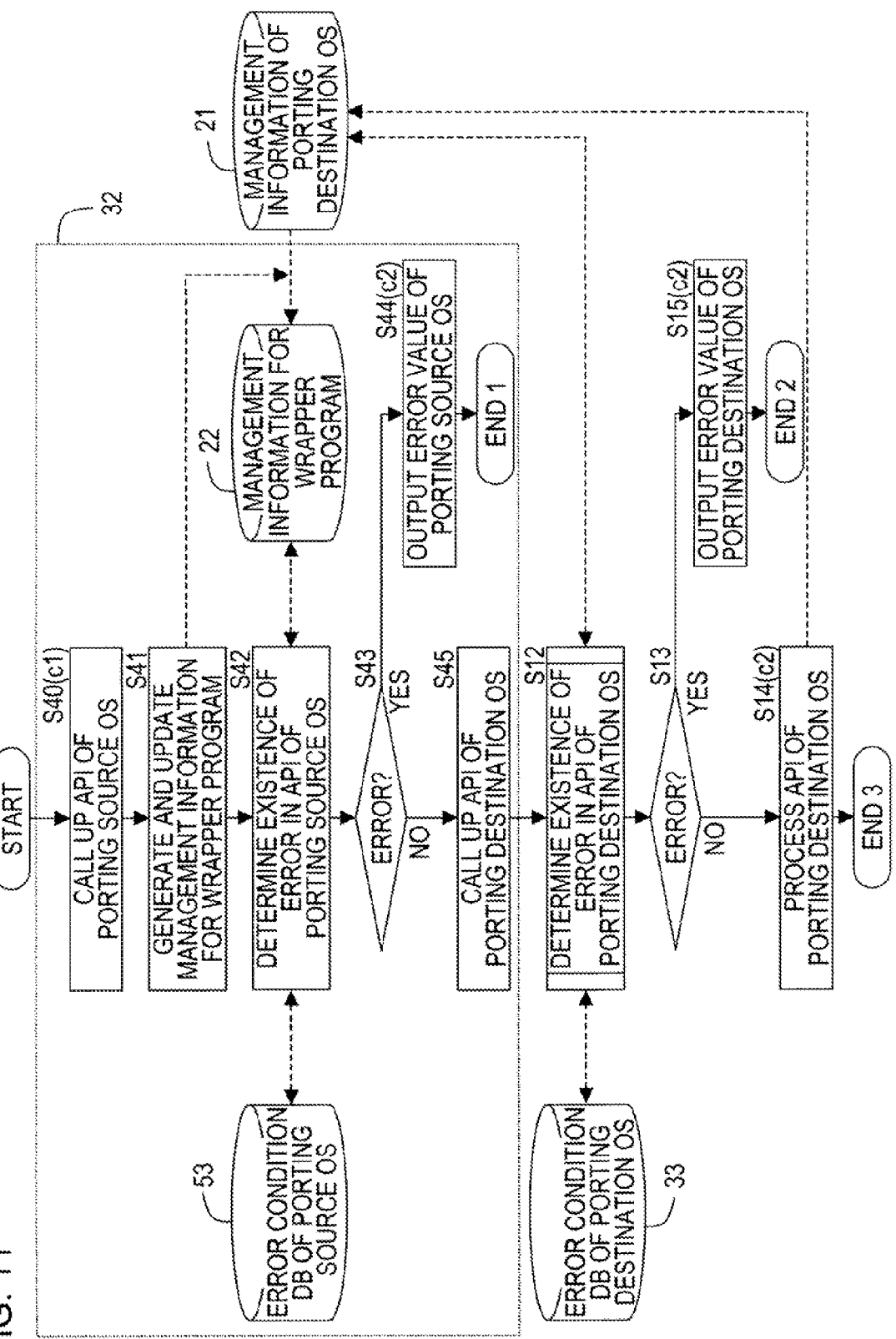
FIG. 11 is a flow chart illustrating a processing flow of the wrapper program and the porting destination OS according to the third embodiment.

FIG. 11 is a flow chart illustrating a processing flow of the wrapper program 32 and the porting destination OS 30 according to the third embodiment. In FIG. 11, processings enclosed by the dotted line (S40 to S45) are processings by the wrapper program 32, and the other processings (S12 to S15) are processings by the porting destination OS.

If an API of the porting source OS 50 is called up by the application 31 (S40), the wrapper program 32 of the present embodiment generates the management information 22 for the wrapper program having the status values of the management information 21 of the porting destination OS, which have been corrected so as to conform to the protocol of the status values of the management information 52 of the porting source OS, as mentioned above (S41). If the wrapper program 32 already has the management information 22 for the wrapper program, the wrapper program 32 updates the management information 22 for the wrapper program based on each status value of the management information 21 of the porting source OS (S41).

The wrapper program 32 refers to the management information 22 for the wrapper program, and obtains the status values related to the API of the porting source OS 50, and then refers to the error condition DB 53 of the porting source OS, and determines whether the API satisfies an error condition based on these status values. The processings after the error determination steps (S44, S45, S12 to S15) are the same as the first embodiment.

The processings in the flow chart in FIG. 11 will now be described using the function sta_tsk in FIG. 10 as an example. In the example in FIG. 10, the application 31-1 has a code to call up the function sta_tsk, which is the API of the porting source OS 50. In this example, the function sta_tsk is a function to set a task other than the self task to the operating state, and is written in program code as "return value=sta_tsk (argument);". An error occurs if the function sta_tsk is processed when the target task specified in the argument is an operation status other than the stop status. The wrapper program 32-2, which corresponds to the function sta_tsk of the porting source OS 50, calls up the API function sta_JskX of the porting destination OS 30.

If the function sta_tsk of the porting source OS 50 is called up by the application 31 (S40 in FIG. 11, d1 in FIG. 10), the wrapper program 32 of the present embodiment generates or updates the management information 22 for the wrapper program (S41). In this example, it is assumed that the target task specified in the argument tskid of the function sta_tsk is already in the operating status.

Then the wrapper program 32 refers to the management information 22 for the wrapper program, and obtains the status value to indicate the operation status of the target task specified in the argument tskid (operating status=1). Since this status value conforms to the protocol of the porting source OS 50, it is determined that an error condition, that the processing target task is already in the operating status, is satisfied based on the error condition DB 53 of the porting source OS (YES in S43), and a corresponding predetermined error value is output to the application 31 (S44, d2 in FIG. 10). This error value is an error value conforming to the same protocol as the case of the application 31 running on the porting source OS 50.

Thus the wrapper program 32 of the present embodiment generates the management information 22 for the wrapper program having the status values of the management information 21 of the porting destination OS, which have been corrected so as to conform to the status values of the management information 52 of the porting source OS, before calling up the API of the porting destination OS 30 corresponding to the API of the porting source OS 50 which was called up by the application 31. Then based on these status values obtained by referring to the management information 22 for the wrapper program, the wrapper program 32 refers to the error condition DB 53 of the porting source OS, and performs the error determination processing. If an error condition is satisfied, the wrapper program 32 outputs an error value corresponding to this error condition in the error condition DB 53 of the porting source OS to the application 31.

Thus the wrapper program 32 can efficiently output error information conforming to the same protocol as the porting source OS 50 to the application 31, even if the return values and the protocol of the status values of the porting source OS 50 and those of the porting destination OS 30 are different. As a consequence, the application 31 which has already been verified in the porting source OS 50 can run on the porting destination OS 30 without making any modifications, and the man-hours to port the application 31 can be decreased.

In the above example, a case of the wrapper program 32 generating or updating the management information 22 for the wrapper program was described. However the management information 22 for the wrapper program may be generated and updated by the porting destination OS 30.

Figure 12:
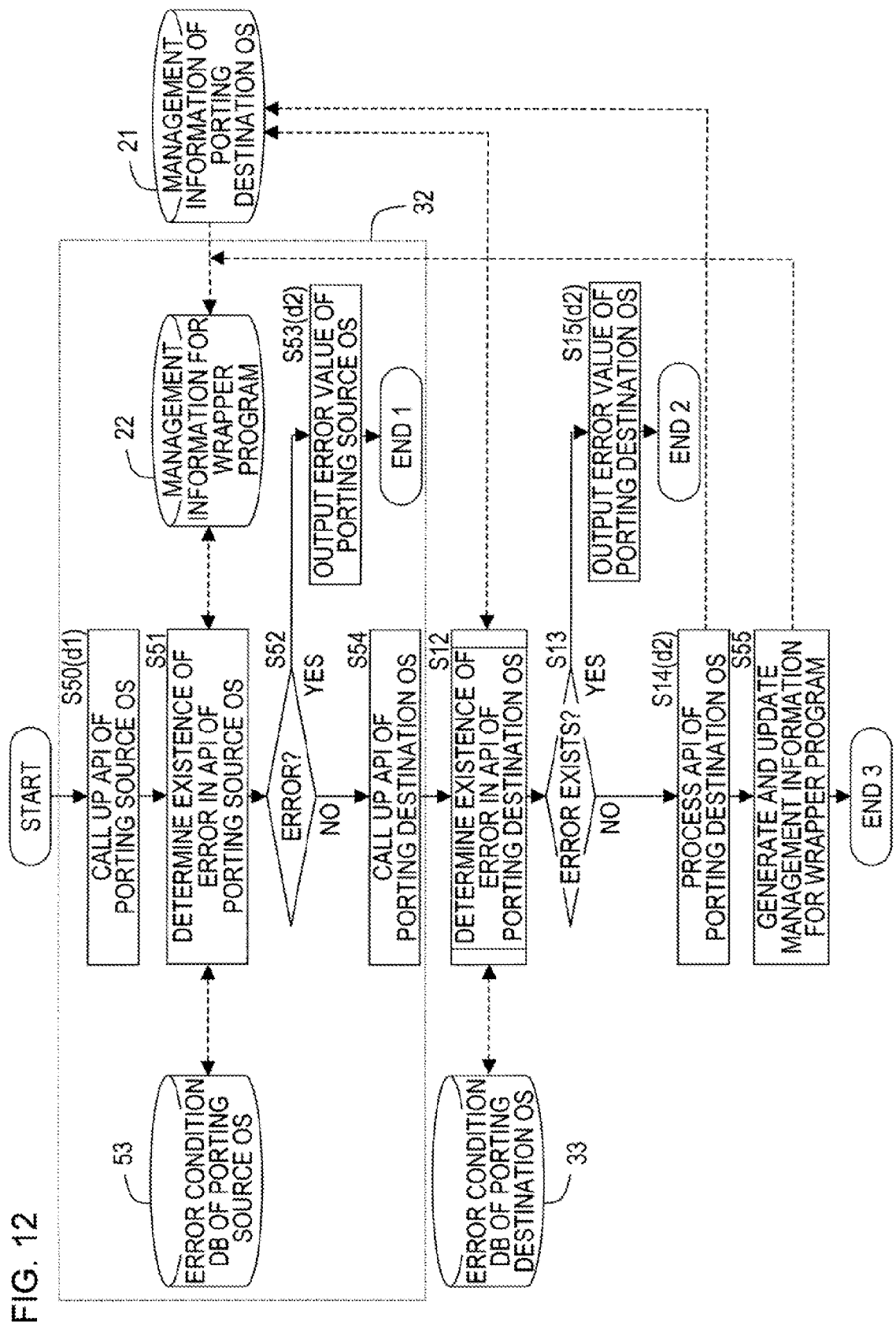
FIG. 12 is a flow chart illustrating an example when the porting destination OS generates and updates the management information for the wrapper program.

FIG. 12 is a flow chart illustrating an example when the porting destination OS generates and updates the management information 22 for the wrapper program. In FIG. 12, the wrapper program 32 does not generate or update the management information 22 for the wrapper program. In this case, the processing to generate and update the management information 22 for the wrapper program does not satisfy an error condition (NO in S52, NO in S13), and is executed of the porting destination OS 30 (S55) after the processing by the API of the porting destination OS 30 corresponding to the API of the porting source OS 50 is executed (S14).

As mentioned above, the status values are mainly updated after API processing. Since the porting destination OS 30 generates or updates the management information 22 for the wrapper program after API processing, the status values of the management information 22 are always updated to the latest status.

As a result, the wrapper program 32 does not generate and update the management information 22 for the wrapper program before the porting source OS 50 determines whether the API has an error (S51), therefore overhead is minimized. If an error condition is satisfied and the API of the porting destination OS is not called up (YES in S52, YES in S13), the management information 22 for the wrapper program is not generated or updated, whereby the number of times of the generation and update processings is minimized, and processing becomes efficient.

Fourth Embodiment

In the first to third embodiments, examples of calling up the API which performs processing on a task on an OS by the application 31 were described. Whereas in the fourth embodiment, a case of calling up the API to refer to the status values (hereafter reference API) by the application 31 will be described. As mentioned above, the protocol of the status values may be different depending on the OS. The wrapper program 32 according to the present embodiment efficiently outputs status values conforming to the same protocol as the porting source OS when the reference API is called up.

Figure 13:
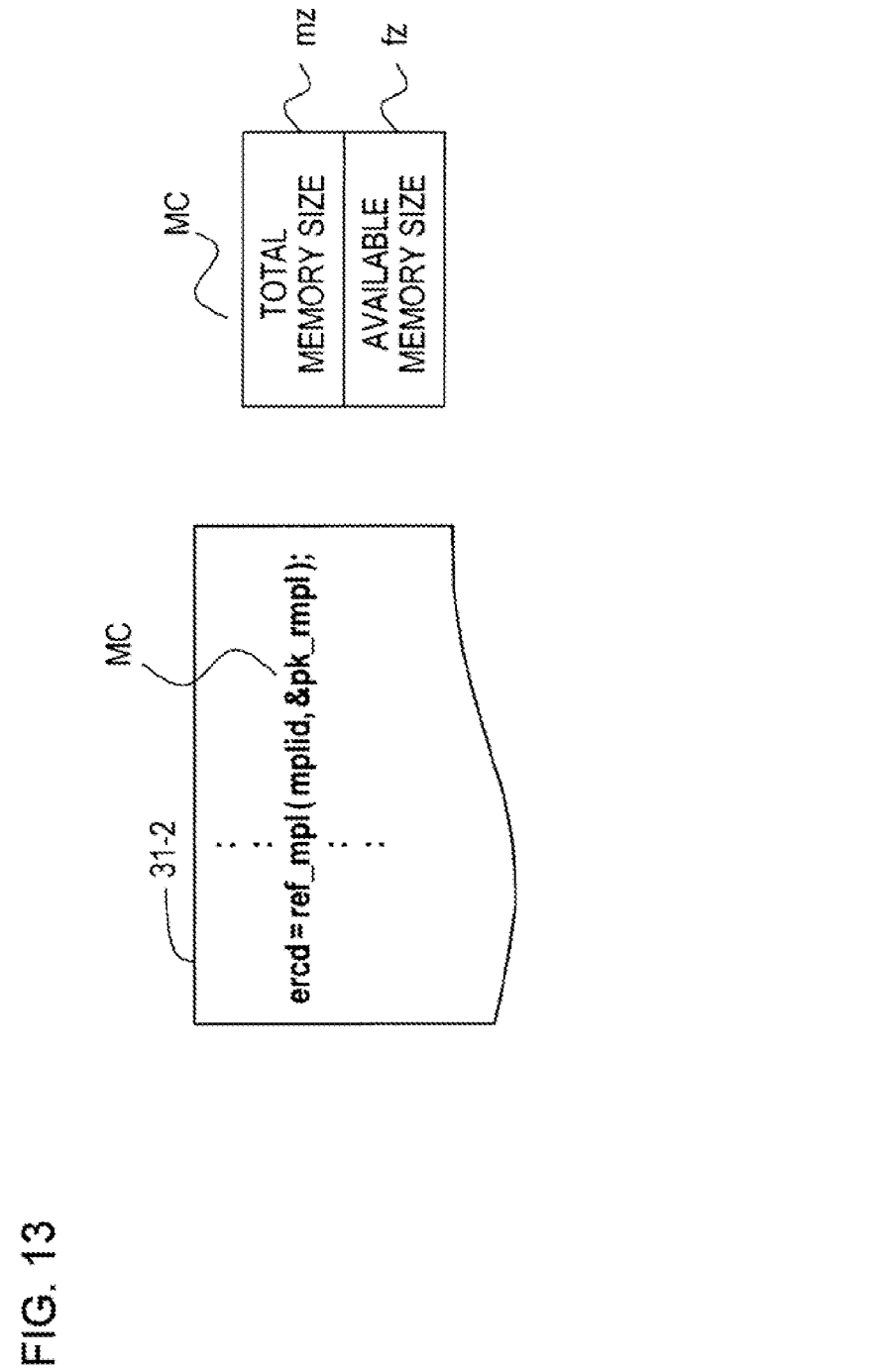
FIG. 13 illustrates an example of an application having a reference API.

FIG. 13 illustrates an example of an application 31-2 having a reference API. In this example, the application 31-2 has a code to call up a function ref_mpl which is an API of the porting source OS 50. The function ref_mpl is a reference API which refers to status values related to a memory pool (mpl), for example, and is written in program code as "return value=ref_mpl (argument 1, argument 2);".

In the function ref_mpl, status values to indicate a total memory size mz and an available memory size fz of the of the memory area of the memory pool are referred to. An identification value (e.g. a positive identification value) of the target memory pool is specified in argument 1 (mplid in this example), and a memory MC to store the status values that this API refers to is specified in argument 2 (&pk_rmpl in this example). As FIG. 13 illustrates, the memory MC stores status values to indicate the total memory size mz and the available memory size fz. If the function is processed, a value to indicate a processing result is output to the return value (ercd in this example), and the total memory size mz and the available memory size fz, which are status values, are stored in the memory MC indicated by argument 2 (&pk_rmpl).

Figure 14:
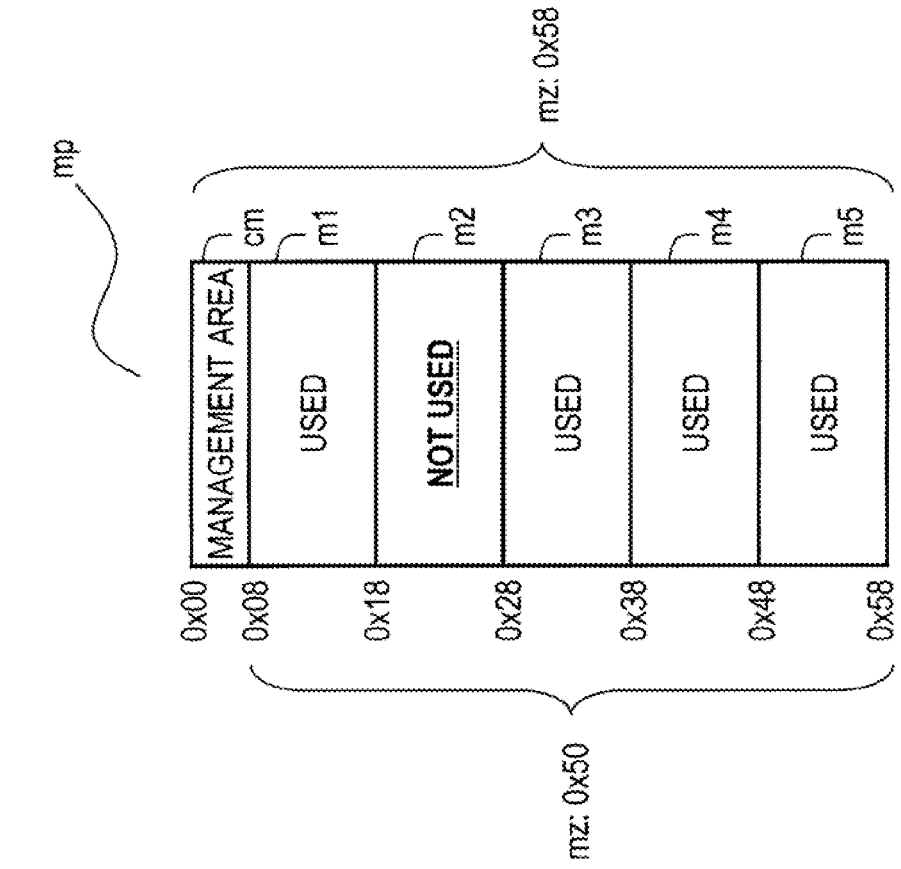
FIG. 14 illustrates a memory area mp which is a management target of the memory pool.

FIG. 14 illustrates a memory area mp which is a management target of the memory pool. The memory pool has a memory management functions of the OS, and secures the memory area having a size specified by the application 31, and manages the secured memory in memory block units. In FIG. 14, the memory area mp has a management area memory cm and five memory blocks m1 to m5. The available memory size fz which is referred to by the function ref_mpl of FIG. 13 indicates a total size of unused memory block m2 out of the memory blocks m1 to m5.

In this example, the meaning (protocol) of the total memory size mz is different between the porting source OS 50 and the porting destination OS 30. In concrete terms, according to this example, the total memory size mz in the porting source OS 50 is 0×50, which does not include the management area memory cm, whereas the total memory size mz in the porting destination OS 30 is 0×58, which includes the management area memory cm.

The application 31 controls subsequent processing based on the status values obtained by the reference API, hence if the protocol of status values is different depending on the OS, as mentioned above, processing by the application 31 becomes unstable. This example will be described with reference to a flow chart.

Figure 15:
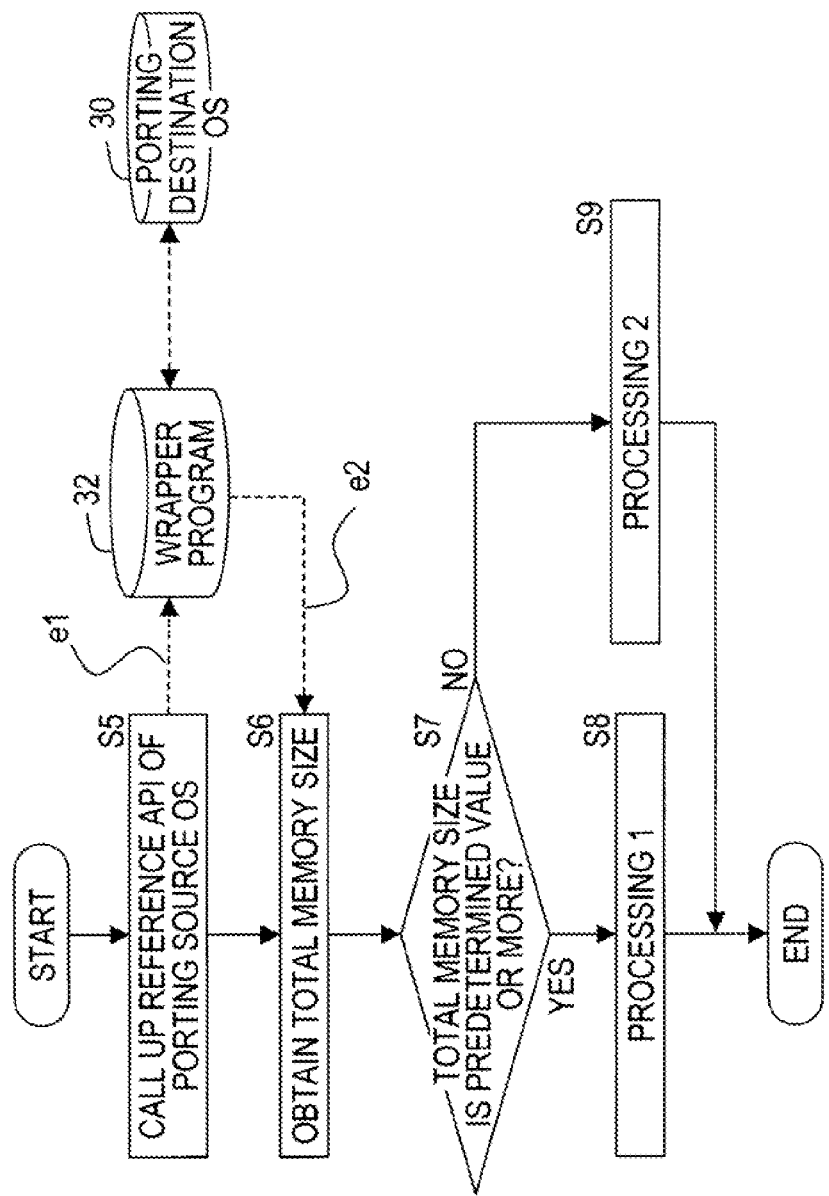
FIG. 15 is a flow chart illustrating a processing example of the application to call up the reference API.

FIG. 15 is a flow chart illustrating a processing example of the application 31 to call up the reference API. If the application 31 calls up a reference API function ref_mpl of the porting source OS 50 (S5), the total memory size mz obtained by the corresponding function of the porting destination OS is obtained via the wrapper program 32 (S6). Then it is determined whether the obtained total memory size mz exceeds a predetermined value (S7). In this example, the predetermined value in the step S7 is set based on the total memory size mz, which does not include the management area memory cm, so as to conform to the protocol of the status values of the porting source OS 50.

The total memory size mz in the porting destination OS 30 however includes the management area memory cm. Therefore in the case of the application 31 running on the porting destination OS 30, the predetermined value based on the total memory size mz, which does not include the management area memory cm, is compared with the total memory size mz, which includes the management area memory cm in the step S7. As a result, when the total memory size sz conforming to the protocol of the porting source OS 50 does not become the predetermined value or more (NO in S7), and processing move to processing 2 (S9), the total memory size mz may reach the predetermined value (YES in S7) because the value conforms to the protocol of the porting destination OS 30, and processing may move to processing 1 (S8).

Thus if the application 31 runs on the porting destination OS 30 when the protocol of the status values is different depending on the OS, the processing content becomes different from the case of running on the porting source OS 50.

Therefore the wrapper program 32 according to the present embodiment refers to the management information 22 for the wrapper program having the status values of the porting destination OS 30, which have been corrected so as to conform to the protocol of the status values of the porting source OS 50, and collects the status values related to the reference API. As a consequence, the wrapper program 32 can output the status values conforming to the protocol of the porting source OS 50 to the application 31.

Figure 16:
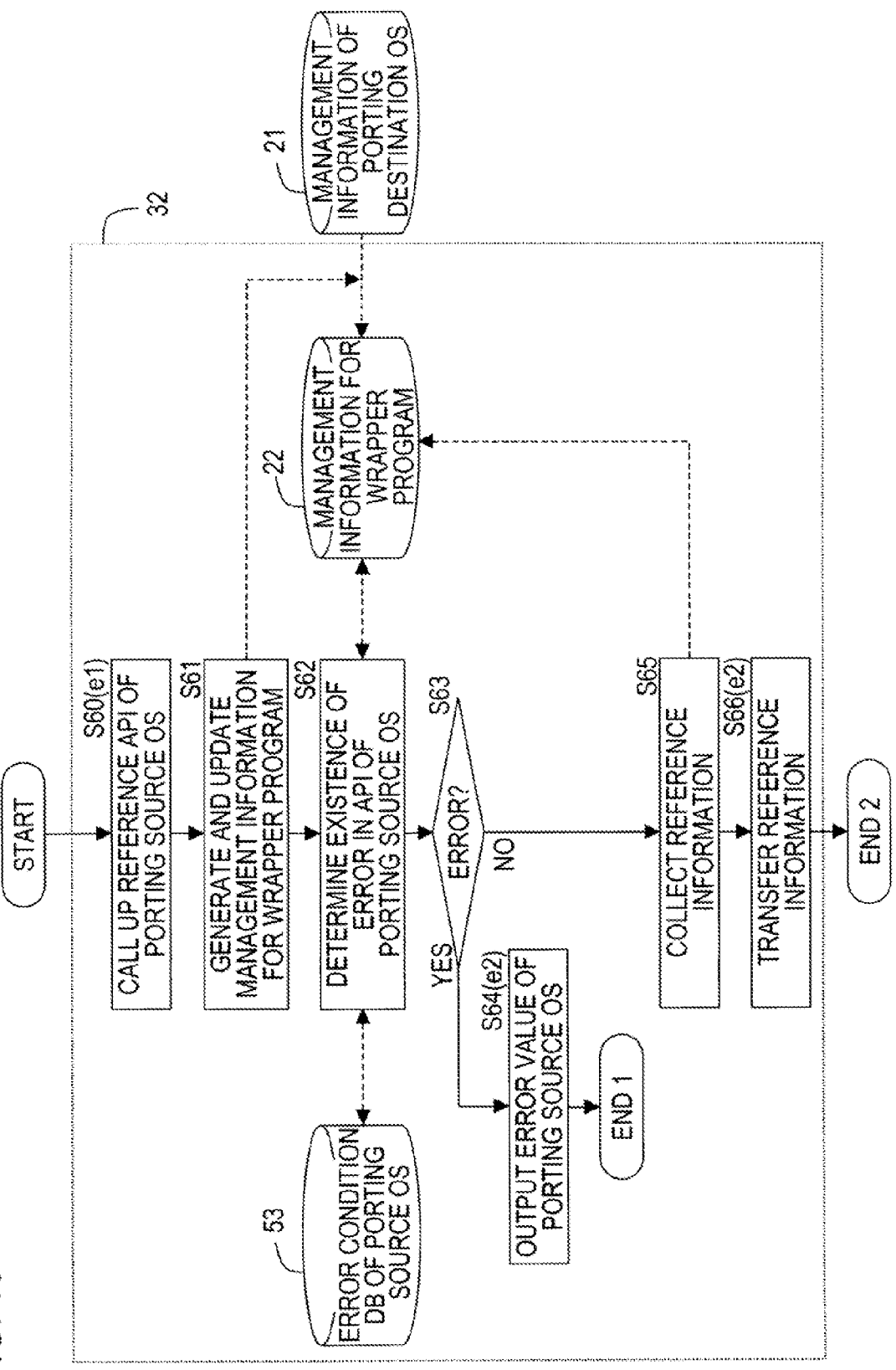
FIG. 16 is a flow chart illustrating a processing flow of the wrapper program and the porting destination OS according to the fourth embodiment.

FIG. 16 is a flow chart illustrating a processing flow of the wrapper program 32 and the porting destination OS 30 according to the fourth embodiment. The processings in FIG. 16 are all processings of the wrapper program 32.

If the reference API of the porting source OS 50 is called up by the application 31 (S60), the wrapper program 32 of the present embodiment generates and updates the management information 22 for the wrapper program having each status value of the management information 21 of the porting destination OS, which has been corrected so as to conform to the protocol of the status values of the management information of the porting source OS (S61), just like the third embodiment. Then the wrapper program 32 refers to the management information 22 for the wrapper program, and obtains the status values related to the API of the porting source OS, and determines whether the API satisfies an error condition with reference to the porting source OS error condition DB 53 based on the obtained status values (S62).

If an error condition is satisfied (YES in S63), the wrapper program 32 outputs the error value based on the error condition DB 53 of the porting source OS to the application 31 as a return value, just like the first embodiment. If no error condition is satisfied (NO in S63), the wrapper program 32 refers to the management information 22 for the wrapper program, collects reference information related to the reference API of the porting source OS 50 (S65), and transfers the reference information to the application 31 (S66).

Thus the wrapper program 32 can output the target status values, which are referred to by the API of the porting source OS 50, to the application 31, without calling up the API of the porting destination OS 30.

The processings in the flow chart in FIG. 16 will now be described using an example of the function ref_mpl in FIG. 13. If the function ref_mpl is called up by the application 31 (S60), the wrapper program 32 of the present embodiment generates and updates the management information 22 for the wrapper program (S61). For example, the wrapper program 32 generates the management information 22 for the wrapper program, where the total memory size mz of the memory pool has been corrected to "the total memory size mz of the porting destination OS—management area memory size cm of the porting destination OS", so as to conform to the protocol of the total memory size mz of the porting source OS 50.

Then the wrapper program 32 refers to the error condition DB 53 of the porting source OS and the management information 22 for the wrapper program, and determines whether the function ref_mpl has an error (S62). If an error condition is satisfied (YES in S63), a return value conforming to the protocol of the porting source OS 50 is output to the application 31 based on the error condition DB 53 of the porting source OS (S64), just like the first embodiment. If no error condition is satisfied (NO in S63), on the other hand, the wrapper program 32 refers to the management information 22 for the wrapper program, and collects the total memory size mz and the available memory size fz of the memory pool (S65). Since the total memory size mz of the management information 22 for the wrapper program does not include the management area size cm, the total memory area mz conforming to the same protocol as the porting source OS 50 is transferred to the application 31 (S66).

Thus the wrapper program 32 of the present embodiment generates the management information 22 for the wrapper program having the status values of the management information 21 of the porting destination OS, which have been corrected so as to conform to the protocol of the status values of the management information of the porting source OS 50. Then the wrapper program 32 refers to this management information 22 for the wrapper program, and collects the status values related to the reference API of the porting source OS called up by the application 31.

As a consequence, even if the protocol of the status values of the porting source OS 50 and that of the porting destination OS 30 are different, the wrapper program 32 can collect the status values conforming to the same protocol as the porting source OS 50, and output the state values to the application 31. Furthermore, the wrapper program 32 can collect the status values related to the reference API which was called up by referring to the management information 22 for the wrapper program, without calling up the API of the porting destination OS 30, hence processing speed can be increased.

A case of the protocol of the status values of the management information being different depending on the OS was described in the above example, but the present embodiment is also effective for the case of the format of the management information (arrangement sequence and sizes of the status values of the management information) being different. As illustrated in FIG. 5A and FIG. 5B, the status values of the management information and arrangement sequence of the status values are different between the management information 21 of the porting destination OS in FIG. 5A, and the management information 52 of the porting source OS in FIG. 5B. This causes the following problems if the wrapper program 32 obtains all the management information in memory, and each of the obtained status values is referred to in this memory, for example.

In this case, the application 31 obtains the management information in one memory using the reference API, for example. Then the application 31 refers to each status value in the memory where the management information of the porting source OS 50 was obtained according to the arrangement sequence and size of each status value. However the format of the management information of the porting destination OS 30 and that of the porting source OS 50 are different, hence the application 31 cannot refer to each status value in the memory based on the format of the management information of the porting destination OS 50.

Therefore the wrapper program 32 constructs the management information 22 for the wrapper program using the same format as the porting source OS 50. As a consequence, the application 31 can refer to each status value in the memory obtained by the reference API, according to the same format as the porting source OS 50.

As described above, the wrapper program 32 of the present embodiment can transfer the reference values (output values) conforming to the same protocol as the porting source OS 50, to the application 31, even if the protocol of the management information (e.g. meaning of each status value and format of management information) of the porting source OS 50 and that of the porting destination OS 30 are different. Hence the application 31 which has been verified by the porting source OS 50 can run on the porting destination OS 30 without making any modifications, and man-hours to port the application 31 can be decreased.

The management information 22 for the wrapper program may be generated and updated by the porting destination OS 30 where the application 31 is running, just like the third embodiment.

Figure 17:
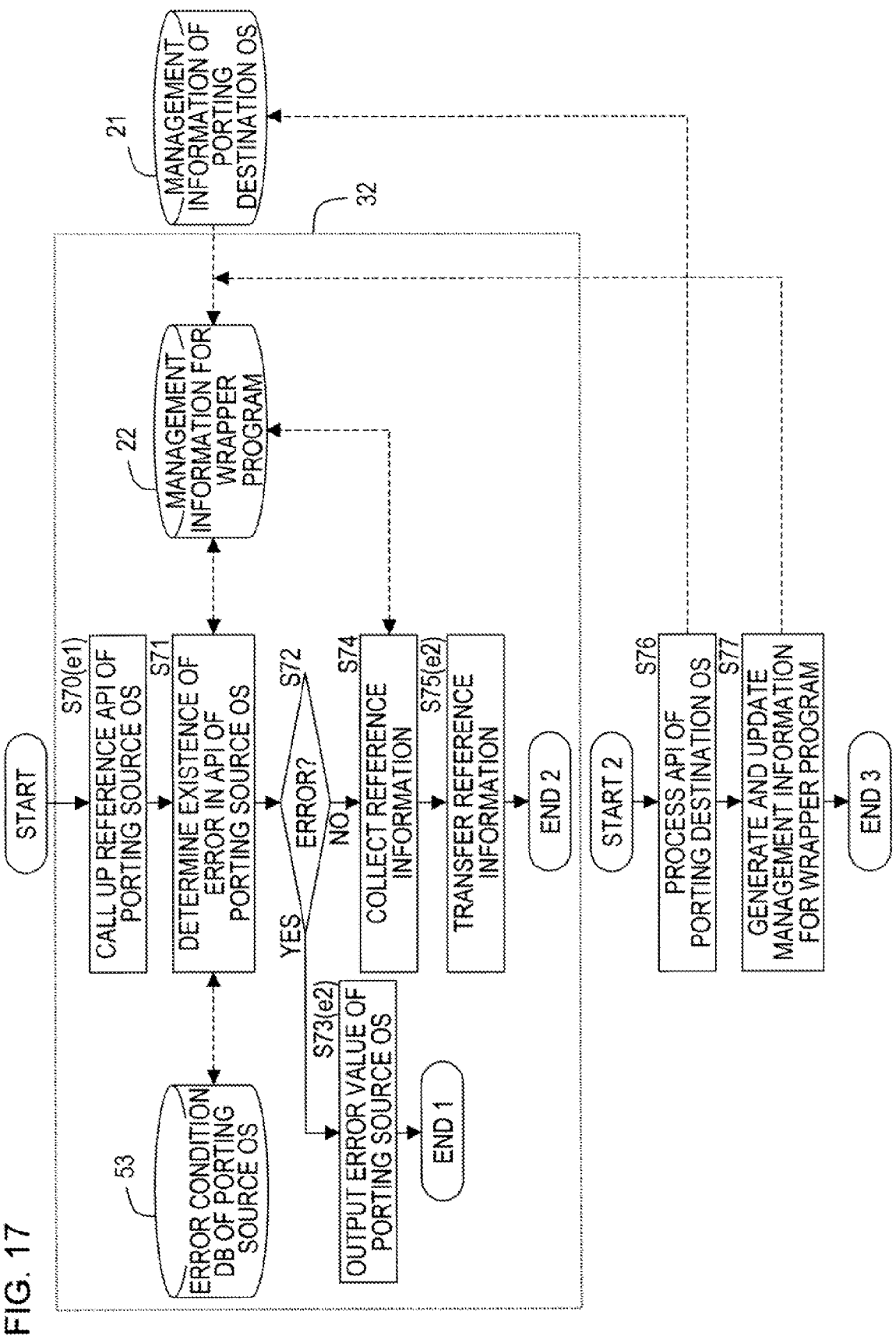
FIG. 17 is a flow chart illustrating an example of the porting destination OS generating and updating the management information for the wrapper program.

FIG. 17 is a flow chart illustrating an example of the porting destination OS 30 generating and updating the management information 22 for the wrapper program. In FIG. 17, the wrapper program 32 does not generate and update the management information 22 for the wrapper program. In this case, the processing to generate and update the management information 22 for the wrapper program is executed by the porting destination OS 30 (S77) every time the API is processed (S76). Since each status value of the management information is not updated during the processing of the reference API, the porting destination OS 30 generates or updates the management information 22 for the wrapper program (S77) after processing the API in the system which is not referred to (S76).

Since the wrapper program 32 does not generate and update the management information 22 for the wrapper program, overhead can be minimized. Moreover, the processing to generate and update the management information 22 for the wrapper program is not generated every time the reference API of the porting source OS 50 is called up, hence the number of times of this processing can be minimized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium storing a wrapper program that causes a computer to execute a process, the process comprising:

converting, when a porting source application program interface (API) is called up by the application program, the API to a porting destination API of a porting destination operating system (OS), in order to allow an application program, having a code to call up the porting source API of a porting source OS, to operate on the porting destination OS which is different from the porting source OS;

wherein the converting includes;

determining whether the porting source API matches the error condition information of the porting source API by referring to a porting source error condition data base, the porting source error condition data base including error condition information of the porting source API and error value of the porting source OS, the error value corresponding to the error condition information;

outputting the error value of the porting source OS to the application program without calling up the porting destination API corresponding to the porting source API, the error value corresponding to the error condition information which matched in the determining, when the error condition information is matched; and calling up the porting destination API corresponding to the porting source API when the error condition information is not matched, so that the porting destination OS executes the porting destination API.

2. The non-transitory computer-readable medium storing the wrapper program according to claim 1, wherein
the error condition information of the porting source error condition data base is error condition information based on a status value, and
in the referring, further referring to wrapper management information including the status value which the porting destination OS updates as management information,
the first determining includes determining whether the porting source API matches the error condition information based on the obtained status value being related to the porting source API by referring to the porting source error condition data base.

3. The non-transitory computer-readable medium storing the wrapper program according to claim 2, wherein
the wrapper management information is generated or updated before the error determination step.

4. The non-transitory computer-readable medium storing the wrapper program according to claim 2, wherein
the wrapper management information is generated or updated by the porting destination OS after the porting destination API is executed.

5. The non-transitory computer-readable medium storing the wrapper program according to claim 2, wherein
the status value of the wrapper management information is a value corrected so as to conform to the protocol of status values of the porting source OS, and
the first determining includes determining whether the porting source API matches the error condition information based on the status value conforming to the protocol of status values of the porting source OS.

6. The non-transitory computer-readable medium storing the wrapper program according to claim 2 wherein,
the process further comprises processing a porting source API, in order to allow an application program, having a code to call up the porting source API of a porting source OS, to operate on a porting destination OS which is different from the porting source OS;
wherein the processing includes,
referring to wrapper management information when the porting source API which refers to the status value is called up from the application program;
obtaining the status value which the porting source API refers to, from the wrapper management information; and
outputting to the application program.

7. The non-transitory computer-readable medium storing the wrapper program according to claim 1, wherein
the error value of the porting source OS is different from error value of the porting destination OS.

8. A non-transitory computer-readable medium storing a wrapper program that causes a computer to execute a process, the process comprising:
processing a porting source application program interface (API), in order to allow an application program, having a code to call up the porting source API of a porting source operating system (OS), to operate on a porting destination OS which is different from the porting source OS;
wherein the processing includes,
referring to wrapper management information including status values which the porting destination OS updates as management information when the porting source API which refers to the status value is called up from the application program, in which the status values in the wrapper management information are values corrected so as to conform to the protocol of status values of the porting source OS;
obtaining the status value being conformed to the protocol of status values of the porting source OS which the porting source API refers to; and
outputting to the application program, without calling up the porting destination API corresponding to the porting source API.

9. The non-transitory computer-readable medium storing the wrapper program according to claim 8, wherein
the wrapper management information is generated or updated before the referring.

10. The non-transitory computer-readable medium storing the wrapper program according to claim 8, wherein
the wrapper management information is generated or updated by the porting destination OS after the porting destination API of the porting destination OS is executed.

11. The non-transitory computer-readable medium storing the wrapper program according to claim 8, wherein
the wrapper management information is constructed in the same format as the management information of the porting source OS, and
in the obtaining, obtaining the status value in the same format as the porting source OS which the porting source API refers to.

12. The non-transitory computer-readable medium storing the wrapper program according to claim 8, wherein
the protocol of status values of the porting source OS is different from protocol of status values of the porting destination OS.

13. An integrated circuit apparatus comprising:
a processor; and
a memory, wherein
the memory has:
a porting destination operating system (OS), which is an OS operating an application program having a code to call up a porting source application program interface (API) of a porting source OS, and is different from the porting source OS;
a porting source error condition data base which includes error condition information of the porting source API and error value of the porting source OS, the error value corresponding to the error condition information; and
a wrapper program that causes the processor to execute converting the porting source API to a porting destination API of the porting destination OS, in order to allow the application program to operate on the porting destination OS, when the porting source API is called up from the application program, the converting comprising,
determining whether the porting source API matches the error condition information of the porting source API by referring to the porting source error condition data base;
outputting the error value of the porting source OS to the application program without calling up the porting destination API corresponding to the porting source API, the error value corresponding to the error condition information which matched in the determining, when the error condition information is matched; and calling up the porting destination API corresponding to the porting source API when the error condition information is not matched, so that the porting destination OS executes the porting destination API.

14. The integrated circuit apparatus according to claim 13, wherein the memory has wrapper management information including a status value which the porting destination OS updates as management information, the error condition information of the porting source error condition data base is error condition information based on the status value, and in the referring, further referring to the wrapper management information, the determining includes determining whether the porting source API matches the error condition information based on the obtained status value being related to the porting source API by referring to the porting source error condition data base.

15. The integrated circuit apparatus according to claim 13, wherein the error value of the porting source OS is different from error value of the porting destination OS.

* * * * *